(12) United States Patent
Yamada et al.

(10) Patent No.: US 9,018,816 B2
(45) Date of Patent: Apr. 28, 2015

(54) ROTOR OF MOTOR HAVING INTERPOLE MAGNETS IN HOLDING MEMBER

(75) Inventors: Yoji Yamada, Hamamatsu (JP); Chie Morita, Kosai (JP); Yuu Mizoguchi, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 226 days.

(21) Appl. No.: 13/495,420

(22) Filed: Jun. 13, 2012

(65) Prior Publication Data

US 2013/0057102 A1 Mar. 7, 2013

(30) Foreign Application Priority Data

Jun. 17, 2011 (JP) ................................. 2011-135393
Oct. 31, 2011 (JP) ................................. 2011-239519
Nov. 9, 2011 (JP) ................................. 2011-245670

(51) Int. Cl.
*H02K 1/27* (2006.01)
*H02K 21/04* (2006.01)
*H02K 21/12* (2006.01)
*H02K 21/14* (2006.01)

(52) U.S. Cl.
CPC ............... *H02K 21/044* (2013.01); *H02K 1/27* (2013.01); *H02K 21/12* (2013.01); *H02K 21/14* (2013.01); *H02K 21/046* (2013.01); *H02K 21/048* (2013.01)

(58) Field of Classification Search
CPC ......... H02K 1/27; H02K 21/44; H02K 21/44; H02K 21/12; H02K 21/14; H02K 21/046; H02K 21/048
USPC ............. 310/156.07, 156.66, 156.69, 156.71, 310/156.72, 156.73, 263
IPC ...................................................... H02K 1/27
See application file for complete search history.

(56) References Cited

U.S. PATENT DOCUMENTS

| 4,309,479 | A | * | 1/1982 | Naruse et al. ................. 428/397 |
| 5,969,459 | A | * | 10/1999 | Taniguchi et al. ............. 310/263 |
| 6,013,967 | A | * | 1/2000 | Ragaly et al. ................. 310/263 |
| 6,333,582 | B1 | | 12/2001 | Asao et al. |
| 7,135,803 | B2 | * | 11/2006 | Maeda et al. ................. 310/263 |
| 8,084,911 | B2 | * | 12/2011 | Takemoto et al. ........ 310/156.25 |
| 8,890,386 | B2 | * | 11/2014 | Morita et al. ............ 310/156.66 |
| 2005/0001508 | A1 | * | 1/2005 | Isoda et al. .................... 310/263 |
| 2007/0262672 | A1 | | 11/2007 | Maekawa et al. |
| 2013/0057102 | A1 | * | 3/2013 | Yamada et al. .......... 310/156.07 |

FOREIGN PATENT DOCUMENTS

JP H03-40848 U 4/1991
JP 5-43749 6/1993

(Continued)

*Primary Examiner* — John K Kim
(74) *Attorney, Agent, or Firm* — Christensen Fonder P.A.

(57) ABSTRACT

A rotor includes first and second rotor cores, a field magnet, interpole magnets and holding members. The first and second rotor cores each have claw-like magnetic poles arranged in the circumferential direction in an outer periphery of a core base at even intervals and formed to protrude radially outward. The field magnet is placed between the core bases in the axial direction of the rotor and magnetized in the axial direction to cause the magnetic poles of the first and second rotor cores to function as first and second magnetic poles, respectively. The interpole magnets are each arranged between a circumferentially adjacent pair of the magnetic poles and magnetized in the circumferential direction so as to have the same polarity as the magnetic poles, which are opposed thereto in the circumferential direction. The holding members hold the interpole magnets to restrict radially outward movement of the interpole magnets.

28 Claims, 21 Drawing Sheets

(56) References Cited

FOREIGN PATENT DOCUMENTS

| JP | 2001-197712 A | 7/2001 |
| JP | 2003-324873 | 11/2003 |
| JP | 2007-306759 A | 11/2007 |
| JP | 2012-115085 | 6/2012 |
| WO | WO 2012/067223 A1 | 5/2012 |

\* cited by examiner

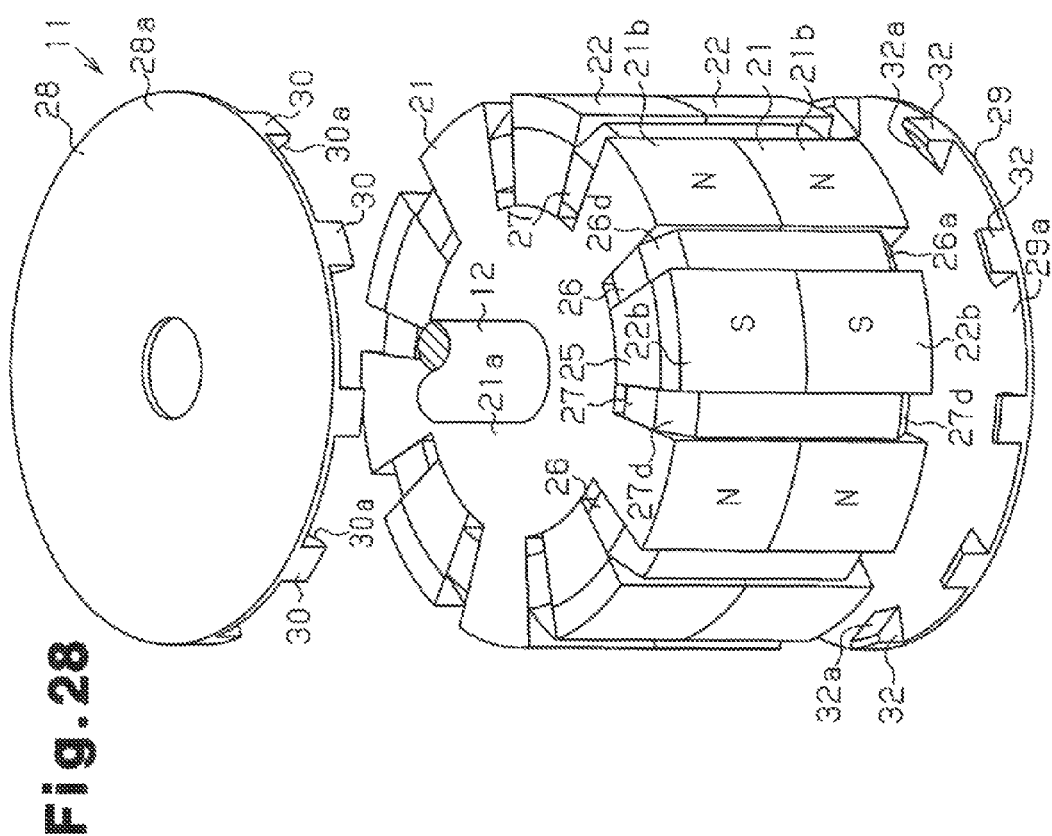

ROTOR OF MOTOR HAVING INTERPOLE MAGNETS IN HOLDING MEMBER

BACKGROUND OF THE INVENTION

The present invention relates to a rotor and a motor.

As rotors for use in motors, permanent magnet field rotors of a Lundell-type structure have been known. For example, refer to Japanese Unexamined Utility Model Application Publication No. 5-43749. In the rotor, two rotor cores, each of which includes a plurality of claw-like magnetic poles arranged in a circumferential direction, are assembled to each other and one field magnet is arranged between these rotor cores. The claw-like magnetic poles in one of the rotor cores and the claw-like magnetic poles in the other rotor core are arranged alternately in the circumferential direction and function as magnetic poles with mutually different polarities.

In the rotor disclosed in the above publication, magnetic flux leakage is reduced in the rotor by firm attachment of back side auxiliary magnets onto radially inner surfaces of claw-like magnetic poles.

However, even though magnetic flux leakage is reduced by back side auxiliary magnets in the above rotor, further reduction of magnetic flux leakage is desired in commercialization in order to achieve higher efficiency and higher output.

SUMMARY OF THE INVENTION

An objective of the present invention is to provide a rotor and a motor in which magnetic flux leakage is further reduced in a stable manner.

To achieve the foregoing objective and in accordance with a first aspect of the present invention, a rotor is provided that includes first and second cores, a field magnet, interpole magnets, and a holding member. The first and second rotor cores each have a core base of a substantially disk shape. The core bases are placed to oppose each other. The first and second rotor cores each have a plurality of claw-like magnetic poles arranged in an outer periphery of the core base in a circumferential direction at even intervals and formed to protrude outwards in a radial direction and to extend in an axial direction. The claw-like magnetic poles of the first rotor core and the claw-like magnetic poles of the second rotor core are arranged alternately in the circumferential direction. The field magnet is arranged between the core bases in an axial direction of the rotor and magnetized in the axial direction to cause the claw-like magnetic poles of the first rotor core to function as a first magnetic pole and cause the claw-like magnetic poles of the second rotor core to function as a second magnetic pole. The interpole magnets are each arranged between a circumferentially adjacent pair of the claw-like magnetic poles. Each interpole magnet is magnetized in the circumferential direction to have the same polarity as the claw-like magnetic poles opposed thereto in the circumferential direction. The holding member holds the interpole magnets in order to restrict radially outward movement of the interpole magnets.

In accordance with a second aspect of the present invention, a motor that includes the rotor according to the first aspect is provided.

BRIEF DESCRIPTION OF THE DRAWINGS

FIG. 28 is a partial exploded perspective view showing the rotor according to another modification of the third embodiment;

FIG. 29 is a cross-sectional view showing the rotor according to another modification of the third embodiment;

DETAILED DESCRIPTION OF THE PREFERRED EMBODIMENTS

First Embodiment

A first embodiment according to the present invention will be described below with reference to FIGS. 1 to 4.

Figure 1:
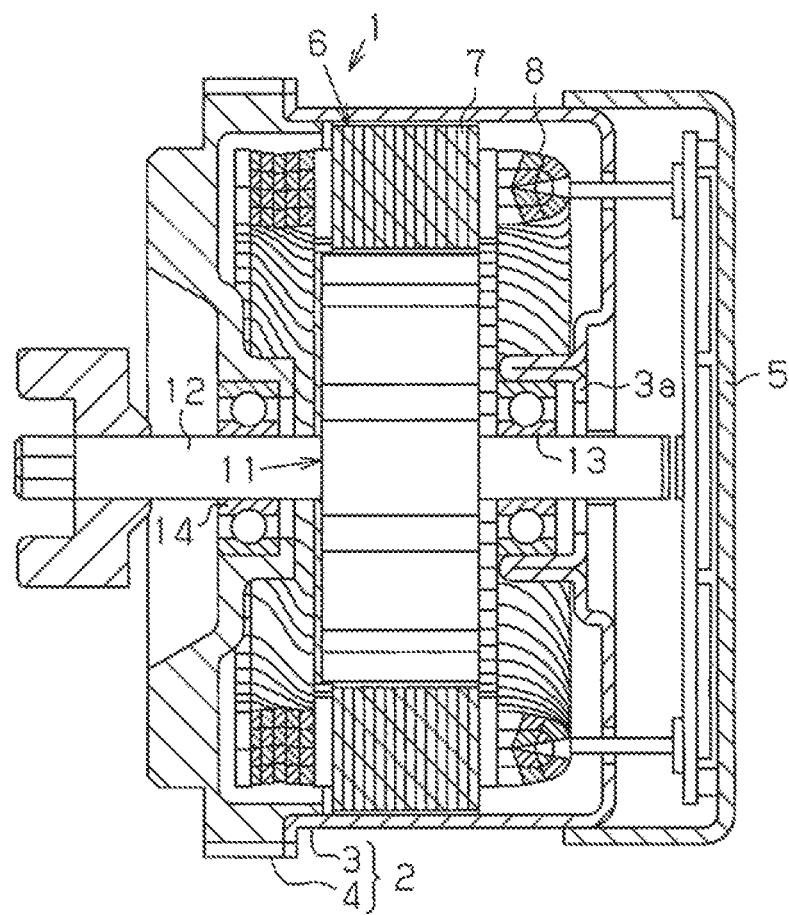
FIG. 1 is a cross-sectional view showing a motor according to a first embodiment of the present invention.

As shown in FIG. 1, a motor 1 has a motor case 2. The motor case 2 has a cylindrical housing 3 with one end closed and a front end plate 4 for closing an opening on the front side of the cylindrical housing 3 (left side as viewed in FIG. 1). Also, a circuit accommodating box 5 for accommodating a power circuit such as circuit substrate is attached to a rear end of the cylindrical housing 3 (the right side as viewed in FIG. 1).

A stator 6 is fixed to an inner circumferential surface of the cylindrical housing 3. The stator 6 has an armature core 7 with a plurality of teeth extending radially inward and segment conductor (SC) coils 8, which are wound around the teeth of the armature core 7.

A rotor 11 of the motor 1 is provided with a rotary shaft 12 and arranged inside the stator 6. The rotary shaft 12 is a metal shaft made of a non-magnetic substance and supported rotationally by bearings 13 and 14, which are supported by a bottom portion 3a of the cylindrical housing 3 and the front end plate 4.

Figure 2A:
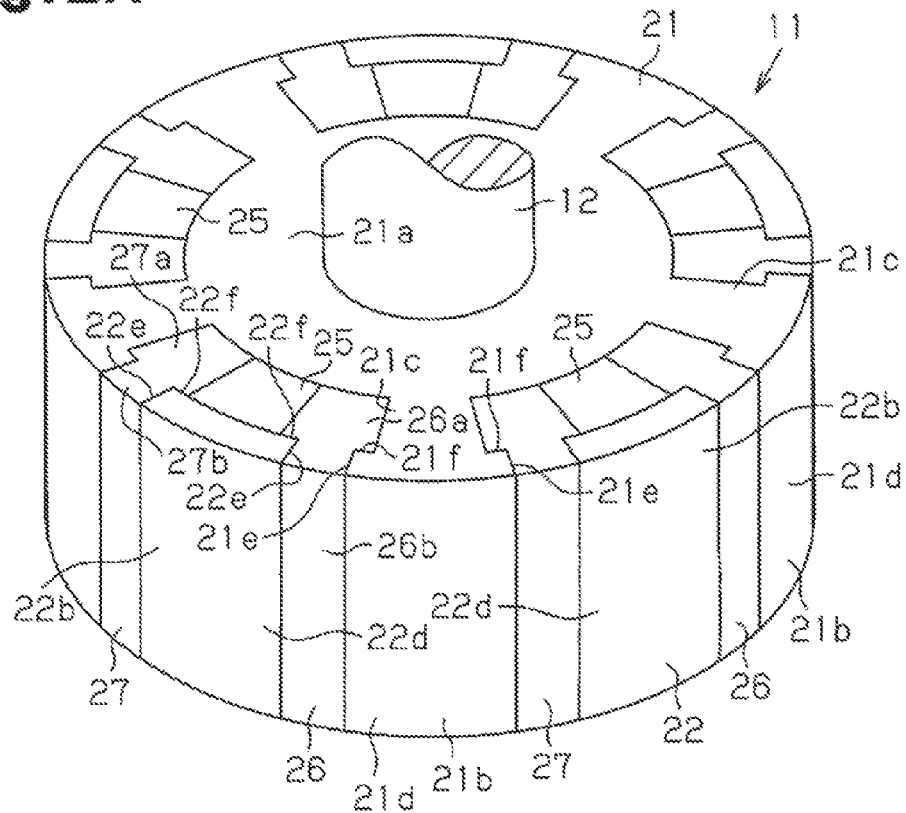
FIGS. 2A and 2B are perspective views showing the rotor according to the first embodiment.
Figure 2B:
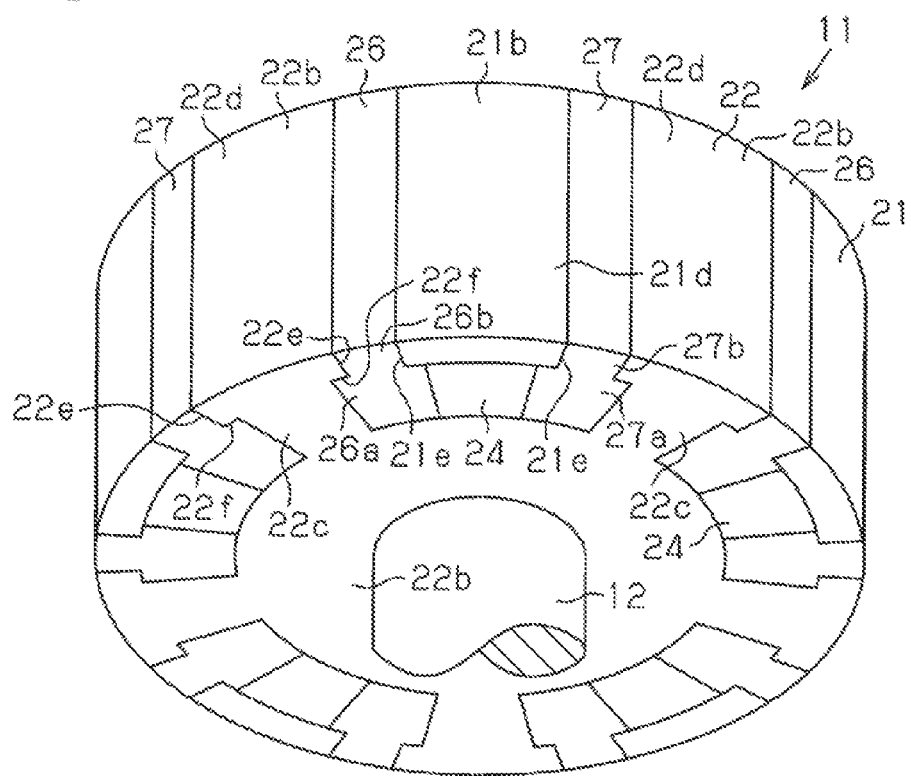
Figure 3:
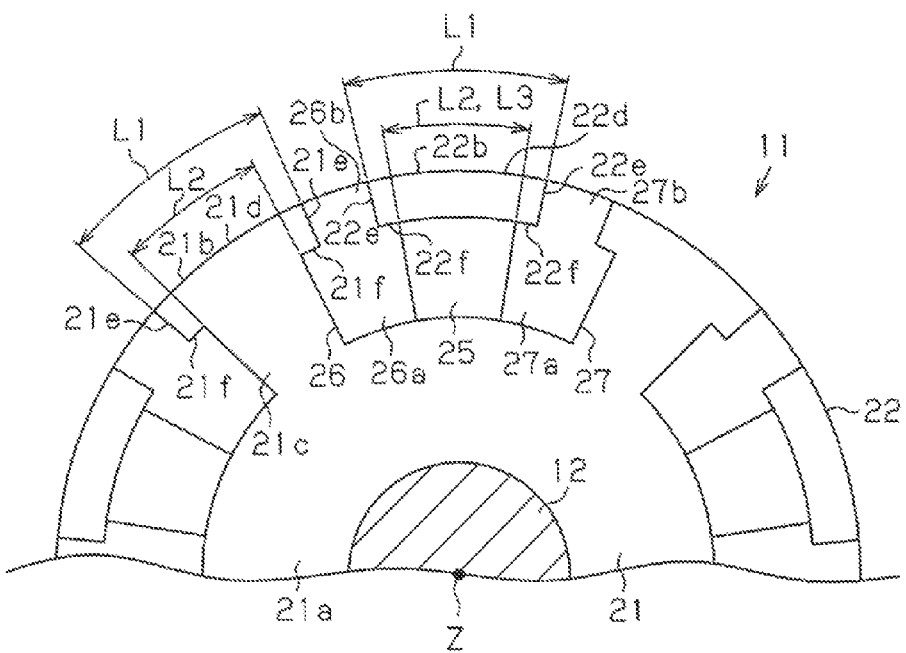
FIG. 3 is a partial plan view showing the rotor according to the first embodiment.
Figure 4:
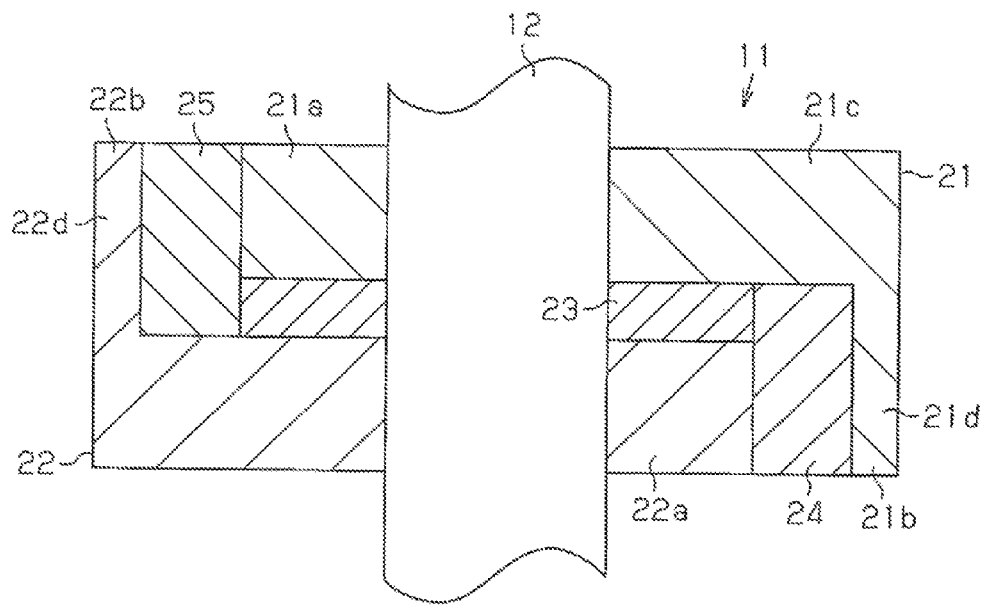
FIG. 4 is a cross-sectional view showing the rotor according to the first embodiment.

As shown in FIGS. 2 to 4, the rotor 11 includes first and second rotor cores 21 and 22, one annular magnet 23 serving as a field magnet (see FIG. 4), a plurality of first and second back side auxiliary magnets 24 and 25 serving as back side auxiliary magnets (see FIGS. 2 and 4), and a plurality of first and second interpole magnets 26 and 27 serving as interpole magnets (see FIG. 2).

The first rotor core 21 has a first core base 21a of a substantially disk shape and a plurality (five in the present embodiment) of first claw-like magnetic poles 21b formed in an outer periphery of the first core base 21a. Each of the first claw-like magnetic poles 21b is formed to protrude radially outward and extend in the axial direction. More specifically, each of the first claw-like magnetic poles 21b includes a protrusion 21c, which protrudes from the outer periphery of the first core base 21a radially outward, and a claw 21d, which is arranged at a distal end of the protrusion 21c and extends in the axial direction. The protrusions 21c are, as shown in FIG. 3, formed into a sectoral shape when seen from the axial direction. Also formed in each of the claws 21d is a pair of circumferential extensions 21e that extend from the distal end of the protrusion 21c to both sides in the circumferential direction. In other words, an angle L1, which corresponds to the circumferential width of each of the claws 21d and involves an axis Z as a center, is set to be larger than an angle L2, which corresponds to the circumferential width of each of the protrusions 21c and involves the axis Z as a center. In the present embodiment, radially inner surfaces 21f are formed as an engagement portion in the circumferential extensions 21e of the claws 21d. The radially inner surfaces 21f function as a holding member for holding the interpole magnets 27 in order to restrict outward movement of the interpole magnets 27 in the radial direction. The claws 21d are also formed into a sectoral shape in a cross-sectional view in a direction orthogonal to the axis and a rectangular shape when seen from the outside in the radial direction. The radial length of each of the claws 21d in the present embodiment is also set to be about half of the radial length of each of the protrusions 21c.

The second rotor core 22 is also formed into the same shape as the first rotor core 21. That is, the second rotor core 22 has a second core base 22a of a substantially disk shape (see FIG. 2B) and a plurality (five in the present embodiment) of second claw-like magnetic poles 22b formed in an outer periphery of the second core base 22a at even intervals. Each of the second claw-like magnetic poles 22b is formed to protrude radially outward and extend in the axial direction. More specifically, each of the second claw-like magnetic poles 22b has a protrusion 22c, which protrudes from the outer periphery of the second core base 22a radially outward, and a claw 22d, which is arranged at a distal end of the protrusion 22c and extends in the axial direction. Each of the protrusions 22c is formed into a sectoral shape when seen from the axial direction in the same manner as the protrusions 21c of the first rotor core 21. Also formed in each of the claws 22d are circumferential extensions 22e extending from the distal end of the protrusion 22c to both sides in the circumferential direction, similar to the claws 21d of the first rotor core 21. In other words, the angle L1, which corresponds to the circumferential width of each of the claws 22d and involves the axis Z as a center, is set to be larger than the angle L2, which corresponds to the circumferential width of each of the protrusions 22c and involves the axis Z as a center. In the present embodiment, radially inner surfaces 22f are formed as an engagement portion in the circumferential extensions 22e of the claws 22d. The radially inner surfaces 22f function as a holding member for holding the interpole magnets 26 in order to restrict outward movement of the interpole magnets 26 in the radial direction. The claws 22d are also formed into a sectoral shape in a cross-sectional view in the direction orthogonal to the axis and a rectangular shape when seen from the outside in the radial direction. The radial length of each of the claws 22d in the present embodiment is also set to be about half the radial length of each of the protrusions 22c. The second rotor core 22 is assembled to the first rotor core 21 such that each of the second claw-like magnetic poles 22b is placed between two of the corresponding first claw-like magnetic poles 21b and, as shown in FIG. 4, the annular magnet 23 is placed or interposed between the first core base 21a and the second core base 22a that are opposed to each other in the axial direction. Accordingly, the first and second claw-like magnetic poles 21b and 22b are arranged alternately in the circumferential direction. In this case, a groove that is rectangular when seen from the outside in the radial direction is formed between circumferentially adjacent first claw-like magnetic poles 21b and second claw-like magnetic poles 22b.

The annular magnet 23 is set to the same outer diameter as the first and second core bases 21a and 22a. The annular magnet 23 is magnetized in the axial direction so as to cause the first claw-like magnetic poles 21b to function as a first magnetic pole (a north pole in the present embodiment) and the second claw-like magnetic poles 22b to function as a second magnetic pole (south pole in the present embodiment).

Also, as shown in FIGS. 2B and 4, the first back side auxiliary magnets 24 are arranged between backs (radially inner surfaces) of the first claw-like magnetic poles 21b (the claws 21d) and an outer peripheral surface of the second core base 22a. The first back side auxiliary magnets 24 are of a substantially rectangular parallelepiped of a sectoral shape in a cross-sectional view in the direction orthogonal to the axis. The first back side auxiliary magnets 24 are magnetized in the radial direction such that faces thereof contacting the backs of the first claw-like magnetic poles 21b (the claws 21d) are the same north pole as the first claw-like magnetic poles 21b and faces thereof contacting the second core base 22a are the same south pole as the second core base 22a in order to reduce magnetic flux leakage in areas where the first back side auxiliary magnets 24 are arranged. Circumferential end surfaces of the first back side auxiliary magnets 24 are also set to be flush with circumferential end surfaces of the protrusions 21c. That is, an angle L3, which corresponds to the circumferential width of each of the first back side auxiliary magnets 24 and involves the axis Z as a center, is set to be the same as the angle L2, which corresponds to the circumferential width of each of the protrusions 21c and involves the axis Z as a center (see FIG. 3).

Also, as shown in FIGS. 2A and 4, the second back side auxiliary magnets 25 are arranged between backs (radially inner surfaces) of the second claw-like magnetic poles 22b (the claws 22d) and an outer peripheral surface of the first core base 21a. The second back side auxiliary magnets 25 are of a substantially rectangular parallelepiped of a sectoral shape in a cross-sectional view in the direction orthogonal to the axis. The second back side auxiliary magnets 25 are magnetized in the radial direction such that faces thereof contacting the backs of the second claw-like magnetic poles 22b (the claws 22d) are the same south pole as the second claw-like magnetic poles 22b and faces thereof contacting the first core base 21a are the same north pole as the first core base 21a in order to reduce magnetic flux leakage in areas where the second back side auxiliary magnets 25 are arranged. Circumferential end surfaces of the second back side auxiliary magnets 25 are also set to be flush with circumferential end surfaces of the protrusions 22c. That is, the angle L3, which corresponds to the circumferential width of each of the second back side auxiliary magnets 25 and involves the axis Z as a center, is set to be the same as the angle L2, which corresponds to the circumferential width of each of the protrusions 22c and involves the axis Z as a center (see FIG. 3).

Moreover, the first back side auxiliary magnets 24 and the second back side auxiliary magnets 25 are formed, as shown in FIG. 4, such that they are laid to overlap each other in the axial direction at a position in the axial direction at which the annular magnet 23 is arranged, or in other words, they are also placed at a position in the axial direction at which the annular magnet 23 is arranged.

Then, the first and second interpole magnets 26 and 27 are arranged alternately between the first claw-like magnetic poles 21b and the second claw-like magnetic poles 22b that are adjacent to each other in the circumferential direction. Specifically, the axial length of each of the first and second interpole magnets 26 and 27 in the present embodiment is set to be the same as the axial length of each of the first and second claw-like magnetic poles 21b and 22b. The first and second interpole magnets 26 and 27 also have inner interpole magnetic portions 26a and 27a arranged in the circumferential direction between the protrusions 21c and 22c (the first and second back side auxiliary magnets 24 and 25) and outer interpole magnetic portions 26b and 27b arranged in the circumferential direction between the claws 21d and 22d, respectively. Then, the inner interpole magnetic portions 26a and 27a are of a substantially rectangular parallelepiped of a sectoral shape in a cross-sectional view in the direction orthogonal to the axis. The inner interpole magnetic portions 26a and 27a are formed to allow circumferential end surfaces thereof to be contacting or brought into surface contact with circumferential end surfaces of the protrusions 21c and 22c and the first and second back side auxiliary magnets 24 and 25. The outer interpole magnetic portions 26b and 27b are also arranged at the center of radially outer surfaces of the inner interpole magnetic portions 26a and 27a and formed into a substantially rectangular parallelepiped of a sectoral shape in a cross-sectional view in the direction orthogonal to the axis. The outer interpole magnetic portions 26b and 27b are formed to allow circumferential end surfaces thereof to be contacting or brought into surface contact with circumferential end surfaces of the claws 21d and 22d. Both ends of the radially outer surfaces of the inner interpole magnetic portions 26a and 27a are set to be engaged with or contacting the radially inner surfaces 21f and 22f (the engagement portions) in the circumferential extensions 21e and 22e of the claws 21d and 22d, respectively.

Then, the first and second interpole magnets 26 and 27 are magnetized in the circumferential direction so as to have the same polarities as the first and second claw-like magnetic poles 21b and 22b that are opposed to each other in the circumferential direction, respectively. That is, each of the first and second interpole magnets 26 and 27 is magnetized in the circumferential direction so as to have the north pole in an area thereof opposed to the first claw-like magnetic pole 21b and have the south pole in an area thereof opposed to the second claw-like magnetic pole 22b.

Next, operation of the motor 1 configured as described above will be described.

In the rotor 11, owing to the arrangement of the first and second back side auxiliary magnets 24 and 25 and the first and second interpole magnets 26 and 27, not only magnetic flux leakage is reduced in areas where these magnets 24 to 27 are arranged but also magnetic flux of the annular magnet 23 is efficiently used for output of the motor 1. Although large centrifugal force is applied to the first and second interpole magnets 26 and 27 when the rotor 11 rotates, the first and second interpole magnets 26 and 27 are prevented from being displaced radially outward since the engagement portions or namely the radially inner surfaces 21f and 22f in the circumferential extensions 21e and 22e are engaged with the first and second interpole magnets 26 and 27 in the radial direction.

Next, characteristic advantages of the first embodiment will be described below.

(1) Since the first and second back side auxiliary magnets 24 and 25, which are magnetized in the radial direction, are located radially inside of the first and second claw-like magnetic poles 21b and 22b (the claws 21d and 22d), magnetic flux leakage to the radial direction is reduced in areas where the first and second back side auxiliary magnets 24 and 25 are arranged. Also, owing to the alternate arrangement of the first and second interpole magnets 26 and 27, which are magnetized in the circumferential direction, between circumferentially adjacent first and second claw-like magnetic poles 21b and 22b, magnetic flux leakage to the circumferential direction is reduced in areas where the first and second interpole magnets 26 and 27 are arranged. In addition, the first and second claw-like magnetic poles 21b and 22b are formed with the engagement portions that are engaged in the radial direction or namely the radially inner surfaces 21f and 22f in the circumferential extensions 21e and 22e in order to restrict outward movement of the first and second interpole magnets 26 and 27 in the radial direction. Therefore, for instance, without particular arrangement of another member, the first and second interpole magnets 26 and 27 are prevented from being displaced radially outward by the engagement portions or namely the radially inner surfaces 21f and 22f in the circumferential extensions 21e and 22e. As a result, higher efficiency and higher output of the motor 1 are achieved in a stable manner while enabling further stable reduction of magnetic flux leakage.

(2) The circumferential end surfaces of the first and second back side auxiliary magnets 24 and 25 are set to be flush with the circumferential end surfaces of the protrusions 21c and 22c. The circumferential end surfaces of the first and second interpole magnets 26 and 27 (the inner interpole magnetic portions 26a and 27a) are formed to be contacting or brought into surface contact with the circumferential end surfaces of the protrusions 21c and 22c and the first and second back side auxiliary magnets 24 and 25, respectively. It is therefore possible to realize an excellent reduction of magnetic flux leakage with the simple planes of the circumferential end surfaces of the first and second interpole magnets 26 and 27 without forming them into a complicated shape.

(3) The first and second interpole magnets 26 and 27 have the inner interpole magnetic portions 26a and 27a arranged between circumferentially adjacent protrusions 21c and 22c, and the outer interpole magnetic portions 26b and 27b arranged between circumferentially adjacent claws 21d and 22d, respectively. It is therefore possible to realize, for instance, an excellent reduction of magnetic flux leakage by arranging many interpole magnets (i.e., the first and second interpole magnets 26 and 27) compared to rotors having no outer interpole magnetic portions 26b and 27b.

The above first embodiment may be modified as follows.

In the above first embodiment, the protrusions 21c and 22c and the claws 21d and 22d in the first and second claw-like magnetic poles 21b and 22b are formed into sectoral shapes when seen from the axial direction. The circumferential end surfaces of these protrusions and claws are shaped to be consistent with a straight line passing through the axis Z of the rotor 11 in the radial direction. The present invention is not limited to that and may be modified as shown in, for instance, FIGS. 5 and 6.

Figure 5:
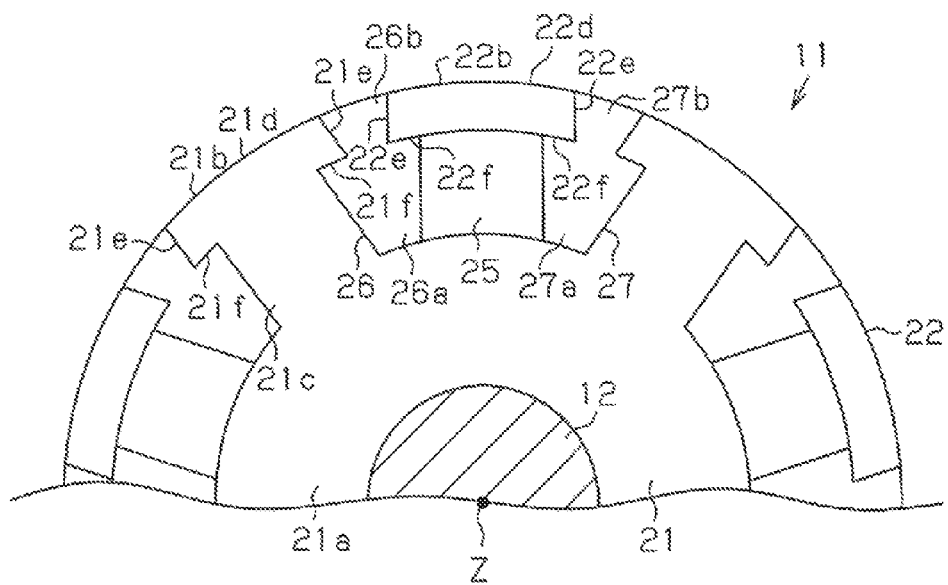
FIG. 5 is a partial plan view showing a rotor according to a modification of the first embodiment.
Figure 6:
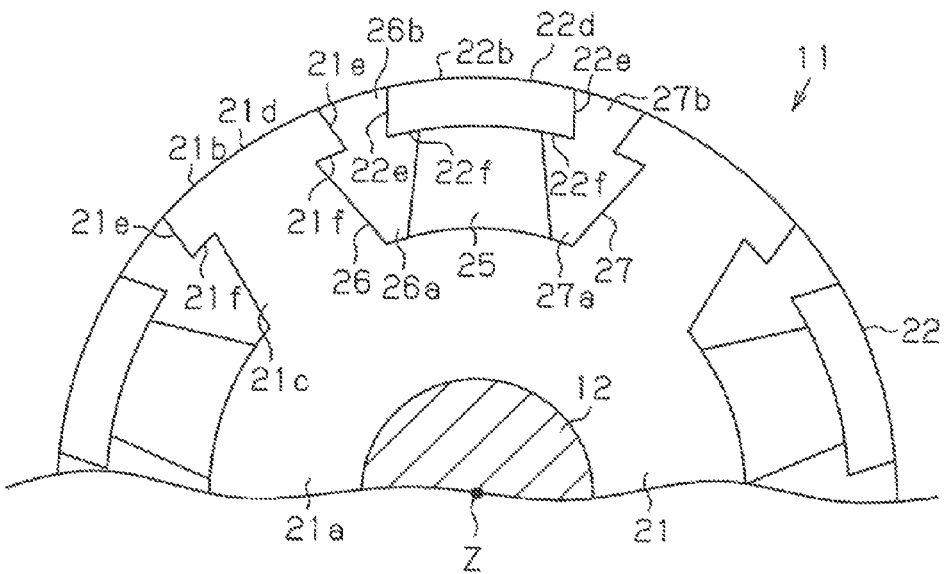
FIG. 6 is a partial plan view showing a rotor according to another modification of the first embodiment.

That is, in the modification shown in FIGS. 5 and 6, the circumferential end surfaces of the claws 21d and 22d in the first and second claw-like magnetic poles 21b and 22b are formed to be symmetrical with respect to a straight line passing through the axis Z of the rotor 11 and centrally through the claws 21d, 22d in the radial direction and are parallel to the straight line. In other words, each of the claws 21d and 22d has a constant circumferential width.

Also, in the modification shown in FIG. 5, both circumferential end surfaces of the protrusions 21c and 22c (only the protrusion 21c is shown in FIG. 5) in the first and second claw-like magnetic poles 21b and 22b are formed to be symmetrical with respect to the straight line passing through the axis Z of the rotor 11 in the radial direction and are parallel to the straight line. In other words, each of the protrusions 21c and 22c (only the protrusion 21c is shown in FIG. 5) has a constant circumferential width in the radial direction. In this modification (see FIG. 5), each of the above components is accompanied by a constant sectional area of a cross-section that is orthogonal to the radial direction, or more precisely, constant magnetic resistance is realized.

In the modification shown in FIG. 6, both circumferential end surfaces of the protrusions 21c and 22c (only the protrusion 21c is shown in FIG. 6) in the first and second claw-like magnetic poles 21b and 22b are formed to be symmetrical with respect to the straight line passing through the axis Z of the rotor 11 and through the center of the protrusion in the radial direction, while the circumferential width of each of the protrusions 21c and 22c increases inwardly in the radial direction. In this modification (see FIG. 6), the strength is improved on the base side or the radially inner side of each of the first and second claw-like magnetic poles 21b and 22b and the claws 21d and 22d are stabilized against rotation.

In these modifications (see FIGS. 5 and 6), the first and second back side auxiliary magnets 24 and 25 (only the second back side auxiliary magnet 25 is shown in FIGS. 5 and 6) and the first and second interpole magnets 26 and 27 are modified into shapes corresponding to the first and second claw-like magnetic poles 21b and 22b (the protrusions 21c and 22c and the claws 21d and 22d).

Figure 7:
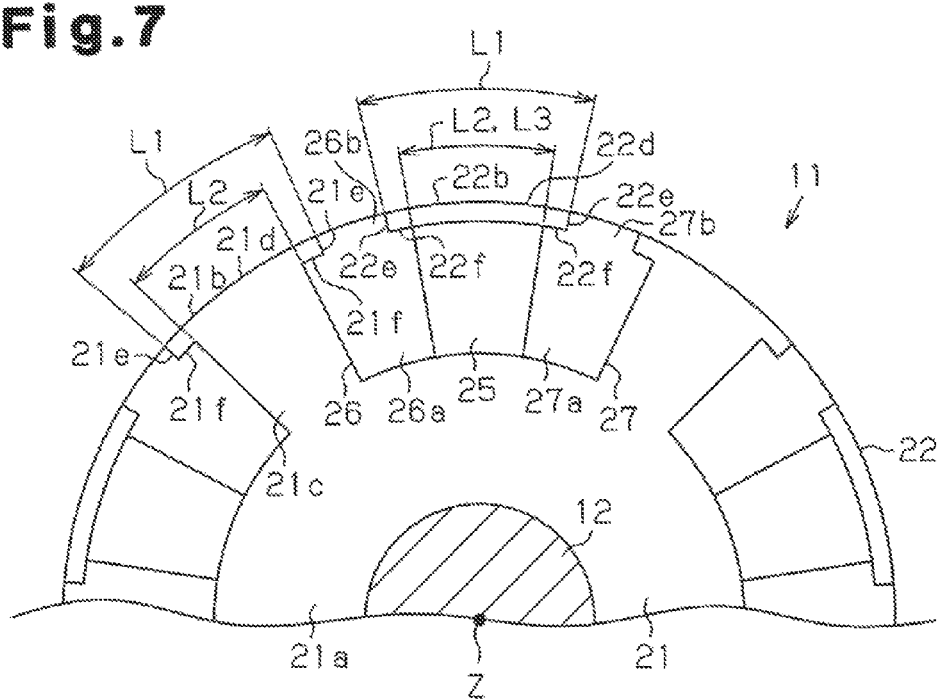
FIG. 7 is a partial plan view showing a rotor according to another modification of the first embodiment.

In the above first embodiment, the radial length of the claws 21d and 22d is set to be about half of the radial length of the protrusions 21c and 22c. The present invention is not limited to that and, for instance, as shown in FIG. 7, the radial length of the claws 21d and 22d may be modified to be less than half and much less than half such as, for example, about one sixth of the radial length of the protrusions 21c and 22c. In this modification, for instance, the first and second claw-like magnetic poles 21b and 22b are easily formed by bending a board.

Figure 8:
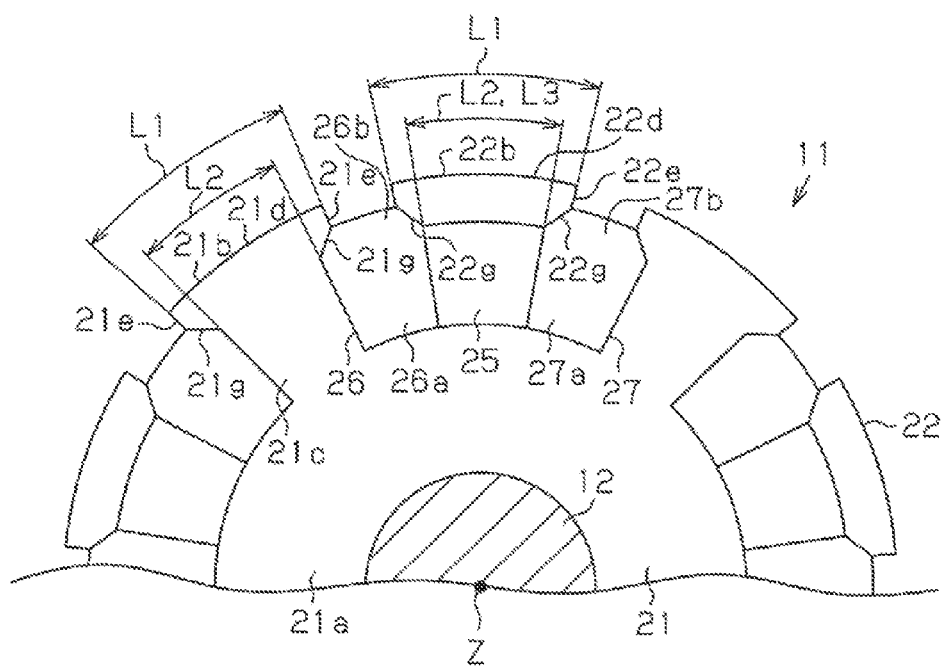
FIG. 8 is a partial plan view showing a rotor according to another modification of the first embodiment.

In the above first embodiment, the claws 21d and 22d are of a sectoral shape in a cross-sectional view in the direction orthogonal to the axis and the radially inner surfaces 21f and 22f (the engagement portions) in the circumferential extensions 21e and 22e are of an arcuate shape with the axis Z as a center, but the present invention is not limited to that and may be modified as shown in, for instance, FIG. 8. That is, in this modification (see FIG. 8), radially inner surfaces (engagement portions) in the circumferential extensions 21e and 22e of the claws 21d and 22d correspond to claw inclined surfaces 21g and 22g that are inclined radially outward toward circumferential direction distal ends of the circumferential extensions 21e and 22e, respectively. Then, in this modification, the outer interpole magnetic portions 26b and 27b of the first and second interpole magnets 26 and 27 are formed to have a substantially trapezoidal cross-section in the direction orthogonal to the axis so as to be contacting or brought into surface contact with the claw inclined surfaces 21g and 22g, respectively. In such a structure, while forming the first and second interpole magnets 26 and 27 into a shape which is hardly damaged or, for instance, setting peripheral interior angles of the claw inclined surfaces 21g and 22g to an obtuse angle when seen from the axial direction, the outer interpole magnetic portions 26b and 27b are arranged between circumferentially adjacent claws 21d and 22d (the claw inclined surfaces 21g and 22g), respectively.

Figure 9:
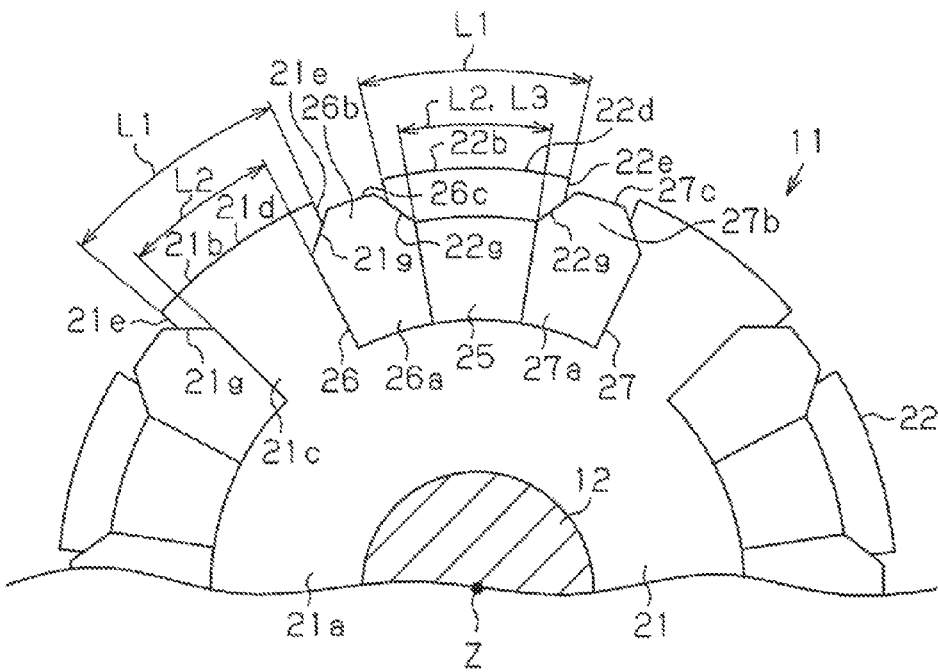
FIG. 9 is a partial plan view showing a rotor according to another modification of the first embodiment.

Also, in this modification (see FIG. 8), the outer interpole magnetic portions 26b and 27b are of a shape extending to the same position in the radial direction as radially outer ends of the claw inclined surfaces 21g and 22g. As shown in FIG. 9, the outer interpole magnetic portions 26b and 27b may also have bulging portions 26c and 27c, which bulge radially outward beyond the claw inclined surfaces 21g and 22g, respectively. The amount of bulging of the bulging portions 26c and 27c is set such that the distance from the axis Z to the radially outer end surface of each of the bulging portions 26c and 27c is equal to or less than the distance from the axis Z to the radially outer end surface of each of the first and second claw-like magnetic poles 21b and 22b. In such a structure, in comparison with the aforementioned modification without the bulging portions 26c and 27c (see FIG. 8), excellent reduction of magnetic flux leakage is realized by providing many interpole magnets (i.e. the first and second interpole magnets 26 and 27). The amount of bulging in the bulging portions 26c and 27c is set such that the distance from the axis Z to the radially outer end surface of each of the bulging portions 26c and 27c becomes equal to or less than the distance from the axis Z to the radially outer end surface of each of the first and second claw-like magnetic poles 21b and 22b. Therefore, the bulging portions 26c and 27c do not protrude radially outward beyond the first and second claw-like magnetic poles 21b and 22b. Accordingly, for instance, the bulging portions 26c and 27c do not cause expansion of the air gap to the stator 6, which is arranged radially outward of the rotor 11 in the radial direction. In addition, in this modification (see FIG. 8), the bulging portions 26c and 27c are separated from the first and second claw-like magnetic poles 21b and 22b (the claws 21d and 22d). As a result, local influence of opposing magnetic field on the bulging portions 26c and 27c is avoided while enabling suppression of demagnetization in the bulging portions 26c and 27c (the first and second interpole magnets 26 and 27).

In the above first embodiment, the engagement portions to be engaged with the first and second interpole magnets 26 and 27 in the radial direction or namely the radially inner surfaces 21f and 22f in the circumferential extensions 21e and 22e are formed in the first and second claw-like magnetic poles 21b and 22b, respectively. The engagement portions may be modified to another structure as long as it is formed in at least either the first and second claw-like magnetic poles 21b and 22b or the first and second back side auxiliary magnets 24 and 25.

Figure 10:
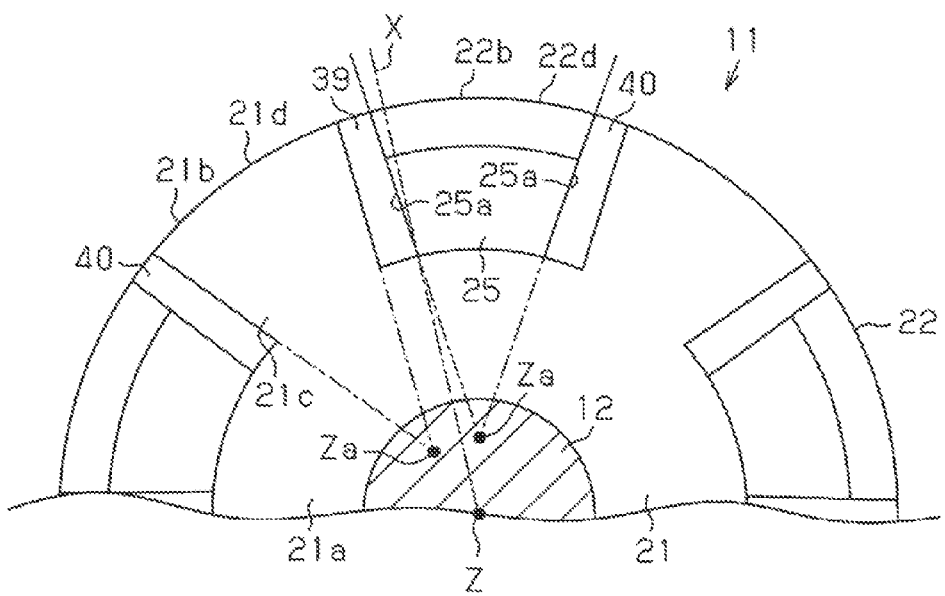
FIG. 10 is a partial plan view showing a rotor according to another modification of the first embodiment.

The engagement portions may also be modified as shown in, for instance, FIG. 10. In this modification (see FIG. 10), circumferential end surfaces of the first and second back side auxiliary magnets 24 and 25 (only the second back side auxiliary magnet 25 is shown in FIG. 10) are back side inclined surfaces 25a inclined relative to straight lines X so as to protrude in the circumferential direction further beyond the straight lines, which run in the radial direction or pass through the axis Z of the rotor 11, toward the radially outer end. The back side inclined surface 25a serves as an engagement portion. In other words, in this modification (see FIG. 10), the circumferential end surfaces of the first and second back side auxiliary magnets 24 and 25 (only the second back side auxiliary magnet 25 is shown in FIG. 10) are formed to be consistent with virtual lines extending in the radial direction from centers Za, each of which is positioned in the outside of the axis Z of the rotor 11 in the radial direction, in order to serve as the back side inclined surfaces 25a (the engagement portions). Also, in this modification (see FIG. 10), the circumferential extensions 21e and 22e are not formed in the claws 21d and 22d. Thus, circumferential end surfaces of the protrusions 21c and 22c (only the protrusion 21c is shown in FIG. 10) and the claws 21d and 22d in this modification (see FIG. 10) are set to be flush with the back side inclined surfaces 25a and partially constitute the engagement portions along with the back side inclined surfaces 25a. In addition, first and second interpole magnets 39 and 40 in this modification (see FIG. 10) are formed into a shape whose circumferential width becomes narrower toward the radially outer end so as to be brought into surface contact with the back side inclined surfaces 25a.

Such a structure makes it possible to prevent the first and second interpole magnets 39 and 40 from being displaced radially outward by the back side inclined surface 25a. The circumferential end surfaces of the first and second claw-like magnetic poles 21b and 22b (the protrusions 21c and 22c and the claws 21d and 22d) also prevents the first and second interpole magnets 39 and 40 from being displaced radially outward.

Figure 11:
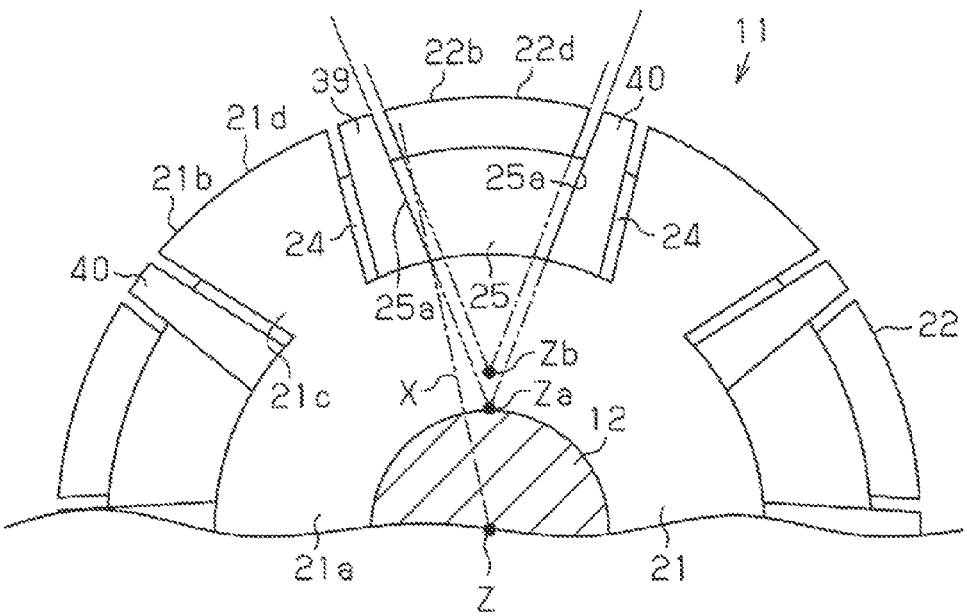
FIG. 11 is a partial plan view showing a rotor according to another modification of the first embodiment.

Moreover, in this modification (see FIG. 10), the circumferential end surfaces of the first and second claw-like magnetic poles 21b and 22b constitute the engagement portions, but the present invention is not limited to that. For instance, as shown in FIG. 11, the circumferential end surfaces of the first and second claw-like magnetic poles 21b and 22b may also be formed in the inside of the back side inclined surfaces 25a in the circumferential direction. To be more specific, in this modification (see FIG. 11), the circumferential end surfaces of the first and second claw-like magnetic poles 21b and 22b are formed to be consistent with virtual lines extending in the radial direction from a center Zb, which is positioned in the outside of the center Za of the back side inclined surfaces 25a in the radial direction, in order to be placed in the inside of the back side inclined surfaces 25a in the circumferential direction.

Such a structure makes it possible to separate the first and second interpole magnets 39 and 40 from the first and second claw-like magnetic poles 21b and 22b with simple planes of the circumferential end surfaces of the first and second interpole magnets 39 and 40 without particularly forming them into a complicated shape. Therefore, local influence of an opposing magnetic field on the first and second interpole magnets 39 and 40 from the first and second claw-like magnetic poles 21b and 22b is avoided while enabling suppression of demagnetization in the first and second interpole magnets 39 and 40.

Figure 12:
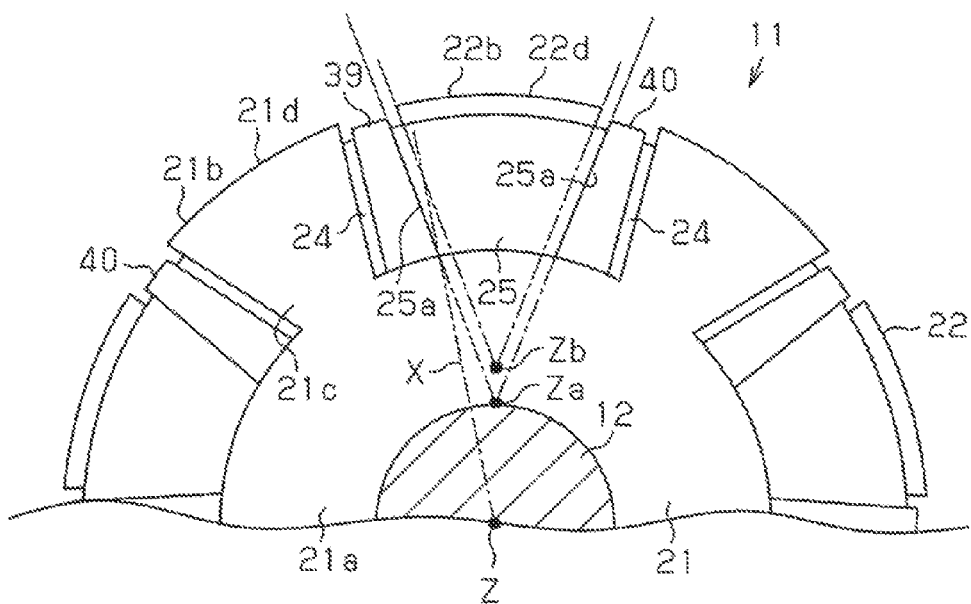
FIG. 12 is a partial plan view showing a rotor according to another modification of the first embodiment.

Moreover, in such a modification (see FIG. 11), for instance, as shown in FIG. 12, the radial length of each of the claws 21d and 22d may also be modified to be less than half and much less than half such as, for example, about one sixth of the radial length of each of the protrusions 21c and 22c (only the protrusion 21c is shown in FIG. 12). In this modification, for instance, the first and second claw-like magnetic poles 21b and 22b are easily formed by bending a board.

In the above first embodiment, the first and second interpole magnets 26 and 27 are provided with the inner interpole magnetic portions 26a and 27b and the outer interpole magnetic portions 26b and 27b, respectively, but the present invention is not limited to that. The outer interpole magnetic portions 26b and 27b arranged between circumferentially adjacent claws 21d and 22d may be omitted. In this case, interpole magnets are composed of only the inner interpole magnetic portions 26a and 27a.

Second Embodiment

Described below with reference to FIGS. 13A to 16 will be a second embodiment according to the present invention. The same reference numbers refer to same members in the first embodiment and explanation thereof will be omitted. Compared to the first embodiment in which the engagement portions function as a holding member for holding the interpole magnets, the second embodiment uses fixing members that function as a holding member for holding interpole magnets in order to restrict radially outward movement of the interpole magnets.

Figure 13A:
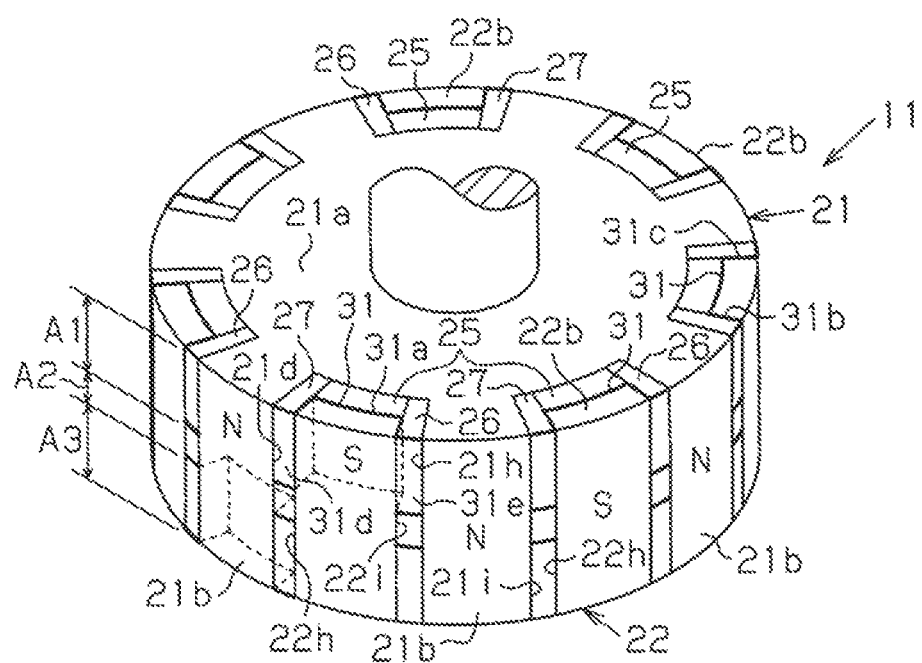
FIG. 13A is a perspective view showing a rotor according to a second embodiment.
Figure 13B:
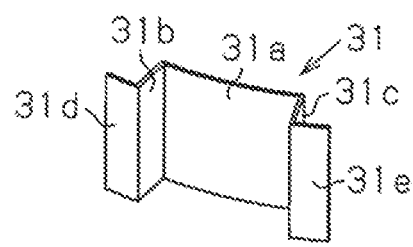
FIG. 13B is a perspective view showing a fixing member according to the second embodiment.
Figure 14:
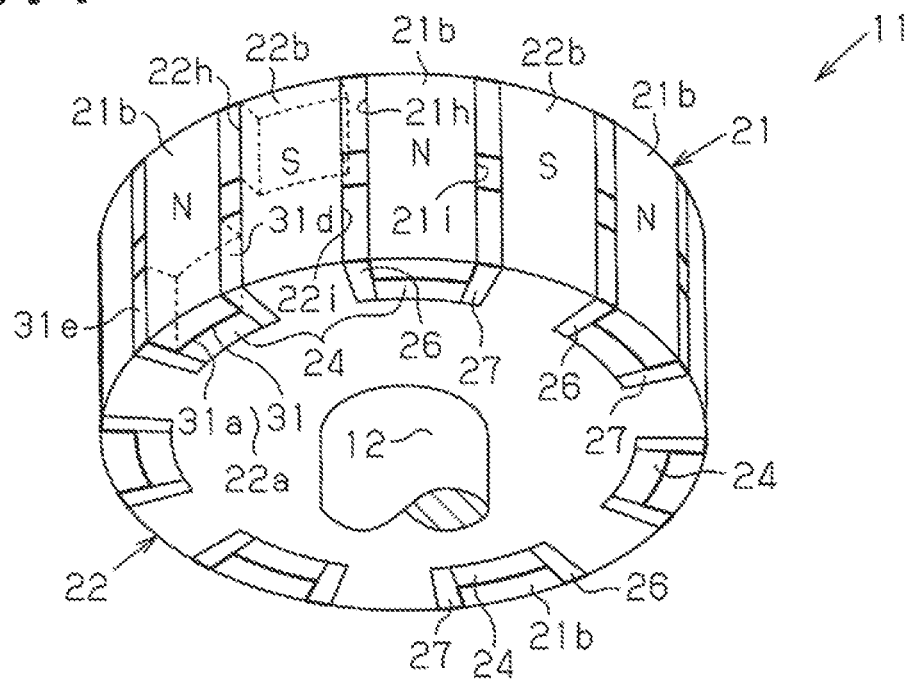
FIG. 14 is a perspective view showing the rotor according to the second embodiment.
Figure 15:
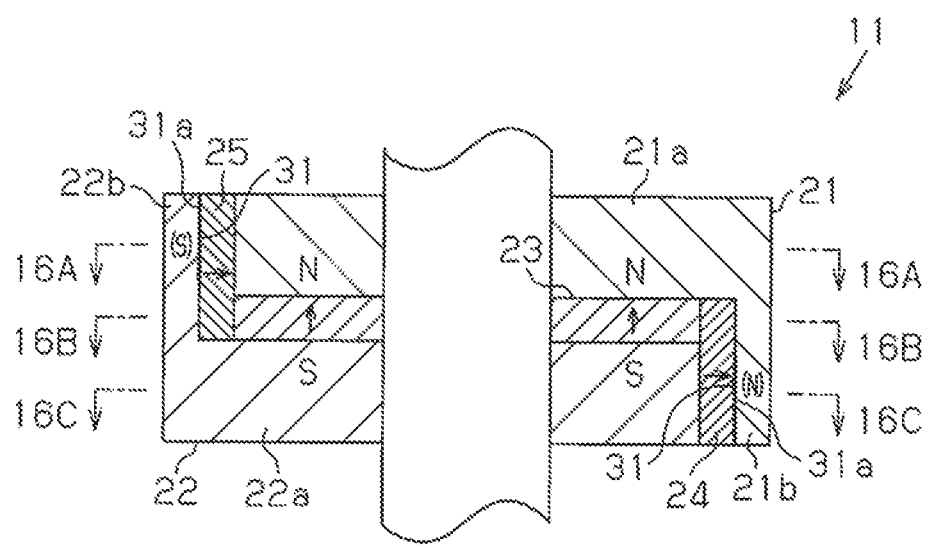
FIG. 15 is a cross-sectional view showing the rotor according to the second embodiment.

As shown in FIGS. 13A, 14 and 15, the rotor 11 includes the first and second rotor cores 21 and 22, the annular magnet 23 serving as a field magnet member (see FIG. 15), the first and second back side auxiliary magnets 24 and 25, the first and second interpole magnets 26 and 27 serving as an interpole magnet, and fixing members 31 (see FIG. 13B).

The first rotor core 21 is formed such that a plurality (seven in the present embodiment) of the first claw-like magnetic poles 21b protrude radially outward and extend in the axial direction at even intervals in an outer periphery of the first core base 21a of a substantially disk shape. Circumferential end surfaces 21h and 21i of the first claw-like magnetic poles 21b are flattened surfaces that extend in the radial direction without being inclined relative to the radial direction when seen from the axial direction. The first claw-like magnetic poles 21b are formed into a sectoral shape in a cross-sectional view in the direction orthogonal to the shaft. The circumferential width (angle) of each of the first claw-like magnetic poles 21b, namely, the circumferential width (angle) between the circumferential end surfaces 21h and 21i, is set to be less than the width (angle) of a clearance made by circumferentially adjacent first claw-like magnetic poles 21b.

The second rotor core 22 is also in the same shape as the first rotor core 21 and formed such that a plurality (seven in the present embodiment) of the second claw-like magnetic poles 22b protrudes radially outward and extends in the axial direction at even intervals in an outer periphery of the second core base 22a of a substantially disk shape. Circumferential end surfaces 22h and 22i of the second claw-like magnetic poles 22b are flattened surfaces extending in the radial direction without being inclined relative to the radial direction when seen from the axial direction. The second claw-like magnetic poles 22b are formed into a sectoral shape in a cross-sectional view in the direction orthogonal to the shaft. The circumferential width (angle) of each of the second claw-like magnetic poles 22b or namely the width (angle) between the circumferential end surfaces 22h and 22i is set to be less than the width (angle) of a clearance made by circumferentially adjacent second claw-like magnetic poles 22b. Then, the second rotor core 22 is assembled to the first rotor core 21 such that each of the second claw-like magnetic poles 22b is placed between the corresponding first claw-like magnetic poles 21b and, as shown in FIG. 15, the annular magnet 23 is placed or interposed between the first core bases 21a and the second core bases 22a in the axial direction.

Figure 16A:
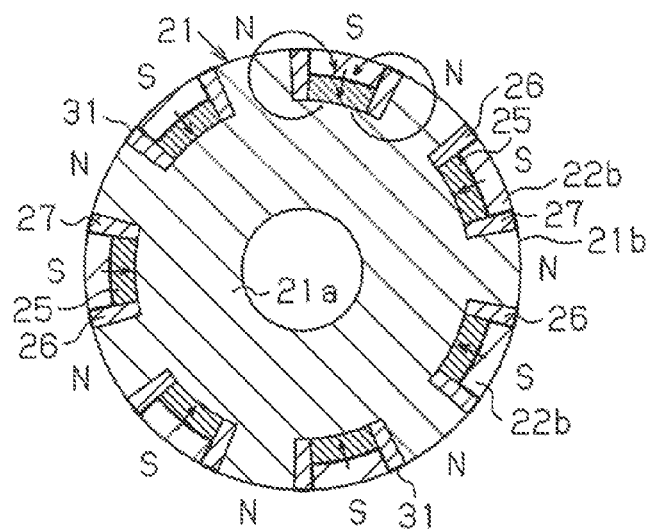
FIG. 16A is a cross-sectional view taken along line 16A-16A of FIG. 15.
Figure 16B:
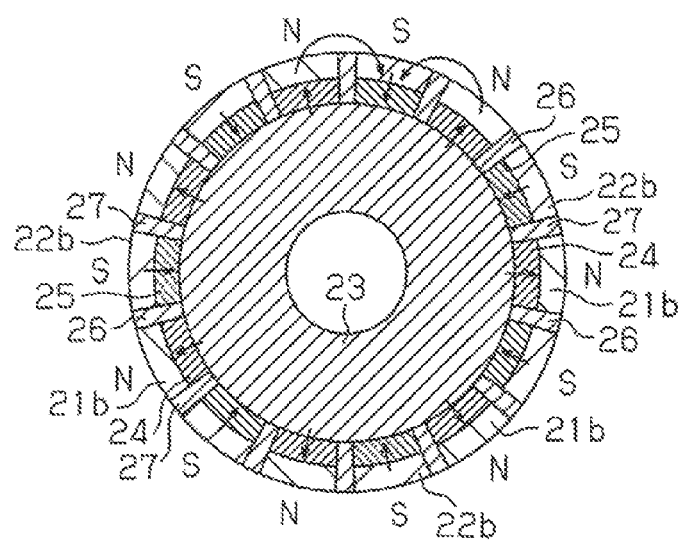
FIG. 16B is a cross-sectional view taken along line 16B-16B of FIG. 15.
Figure 16C:
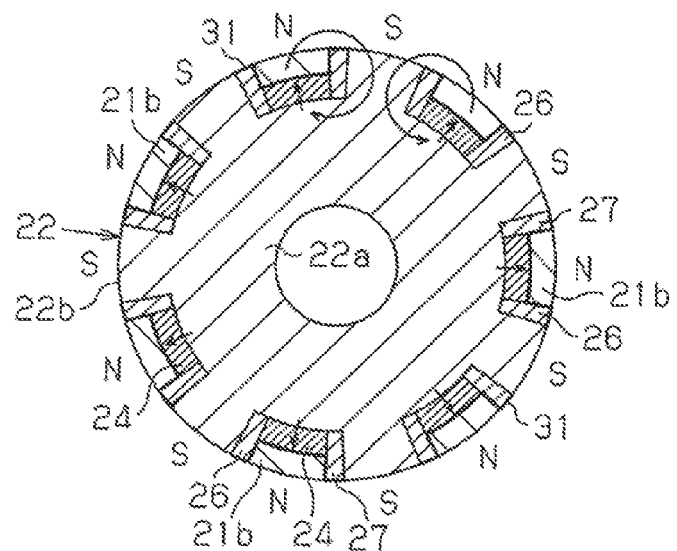
FIG. 16C is a cross-sectional view taken along line 16C-16C of FIG. 15.

Also, as shown in FIG. 14, FIGS. 15 and 16C, the first back side auxiliary magnet 24 is arranged between the back (radially inner surface) of each of the first claw-like magnetic poles 21b and an outer peripheral surface of the second core base 22a. The first back side auxiliary magnets 24 are of a sectoral shape in a cross-sectional view in the direction orthogonal to the shaft. The first back side auxiliary magnets 24 are magnetized in the radial direction such that faces thereof contacting the backs of the first claw-like magnetic poles 21b are the same north pole as the first claw-like magnetic poles 21b and faces thereof contacting the second core base 22a are the same south pole as the second core base 22a.

Also, as shown in FIGS. 13A, 15 and 16A, the second back side auxiliary magnet 25 is arranged between the back (radially inner surface) of each of the second claw-like magnetic poles 22b and an outer peripheral surface of the first core base 21a. The second back side auxiliary magnets 25 are of a sectoral shape in a cross-sectional view in the direction orthogonal to the shaft. The second back side auxiliary magnets 25 are magnetized in the radial direction such that faces thereof contacting the backs of the second claw-like magnetic pole 22b are the same south pole as the second claw-like magnetic poles 22b and faces thereof contacting the first core base 21a are the same north pole as the first core base 21a.

The first back side auxiliary magnets 24 and the second back side auxiliary magnets 25 are also formed, as shown in FIG. 15, such that they are laid to overlap each other in the axial direction at a position in the axial direction at which the annular magnet 23 is positioned, or in other words, they are also placed at a position in the axial direction at which the annular magnet 23 is positioned.

That is, in a range A1 shown in FIG. 13A, a structure similar to a rotor of a so-called consequent pole structure is created by the second back side auxiliary magnets 25 as shown in FIG. 16A. Also, in a range A2 shown in FIG. 13A, a structure similar to a normal rotor in which permanent magnets of different polarities are arranged alternately in the circumferential direction is created by the first and second back side auxiliary magnets 24 and 25 as shown in FIG. 16B. Moreover, in a range A3 shown in FIG. 13A, a structure similar to a rotor of a so-called consequent pole structure is created by the first back side auxiliary magnets 24 as shown in FIG. 16C.

In addition, the first and second interpole magnets 26 and 27 are arranged alternately between circumferentially adjacent first claw-like magnetic poles 21b and second claw-like magnetic poles 22b. Specifically, the first interpole magnets 26 in the present embodiment are placed to fill in entire clearances between one flattened surfaces, which are created by the circumferential end surfaces 21h on one side of the first claw-like magnetic poles 21b and the circumferential end surfaces of the first back side auxiliary magnets 24, and the other flattened surfaces, which are created by the circumferential end surfaces 22i on the other side of the second claw-like magnetic poles 22b and the circumferential end surfaces of the second back side auxiliary magnets 25. The second interpole magnets 27 in the present embodiment are also placed to fill in the entire clearances between one flattened surfaces, which are created by the circumferential end surfaces 21i on the other side of the first claw-like magnetic poles 21b and the circumferential end surfaces of the first back side auxiliary magnets 24, and the other flattened surfaces, which are created by the circumferential end surfaces 22h on one side of the second claw-like magnetic poles 22b and the circumferential end surfaces of the second back side auxiliary magnets 25. Then, the first and second interpole magnets 26 and 27 are magnetized in the circumferential direction so as to have the same polarities with the first and second claw-like magnetic poles 21b and 22b, which are opposed thereto in the circumferential direction, respectively. That is, each of the first and second interpole magnets 26 and 27 is magnetized in the circumferential direction so as to have the north pole in an area opposed to the first claw-like magnetic pole 21b and have the south pole in an area opposed to the second claw-like magnetic pole 22b.

Then, the first and second interpole magnets 26 and 27 are prevented from being displaced radially outward by the fixing members 31 as shown in FIG. 13B. The fixing members 31 are made of a stainless board of a non-magnetic substance. Each of the fixing members 31 has a sandwiched portion 31a to be radially sandwiched inside of each of the first claw-like magnetic poles 21b or the second claw-like magnetic poles 22b. More specifically, the sandwiched portions 31a in the present embodiment are located radially inside of the first claw-like magnetic poles 21b and sandwiched between the radially inner end surfaces of the first claw-like magnetic poles 21b and radially outer end surfaces of the first back side auxiliary magnets 24. alternatively, the sandwiched portions 31a are located radially inside of the second claw-like magnetic poles 22b and sandwiched between radially inner end surfaces of the second claw-like magnetic poles 22b and radially outer end surfaces of the second back side auxiliary magnets 25. The sandwiched portions 31a in the present embodiment are also interposed in entire circumferential areas between the first claw-like magnetic poles 21b and the first back side auxiliary magnets 24 or in the entire circumferential areas between the second claw-like magnetic poles 22b and the second back side auxiliary magnets 25.

Each of the fixing members 31 also has radial coupling portions 31b and 31c that extend in the radial direction from the sandwiched portion 31a to radially outer end surfaces of the first and second interpole magnets 26 and 27 along circumferential end surfaces of the first and second interpole magnets 26 and 27. That is, the radial coupling portions 31b and 31c in the present embodiment extend radially outward from both circumferential ends of the sandwiched portion 31a to the radially outer end surfaces of the first and second interpole magnets 26 and 27.

Each of the fixing members 31 also has contacting/holding portions 31d and 31e that extend in the circumferential direction from radially outer ends (distal ends) of the radial coupling portions 31b and 31c so as to cover the radially outer end surfaces of the first and second interpole magnets 26 and 27, respectively. The fixing members 31 in the present embodiment are thus regarded as a bilateral holding/fixing member, having the radial coupling portions 31b and 31c and the contacting/holding portions 31d and 31e on both circumferential sides of each of the sandwiched portions 31a.

Next, operation of the motor 1 configured as describe above will be described.

In the rotor 11, the first and second interpole magnets 26 and 27 are arranged alternately between circumferentially adjacent first claw-like magnetic poles 21b and second claw-like magnetic poles 22b. Therefore, magnetic force is reinforced in the magnetic pole portions (i.e., the first and second claw-like magnetic poles 21b and 22b) and magnetic flux leakage is reduced between the first claw-like magnetic poles 21b and the second claw-like magnetic poles 22b, allowing efficient use of magnetic flux of the annular magnet 23 for output of the motor 1.

Then, in the motor 1, when a current is supplied to drive the segment conductor (SC) coils 8 via a power circuit in the circuit accommodating box 5, a magnetic field is generated in the stator 6 to rotate the rotor 11 and thus causes the rotor 11 to rotate.

Next, characteristic advantages of the above second embodiment will be described below.

(1) Because the fixing members 31 provided in the rotor 11 have the sandwiched portions 31a to be radially sandwiched at a position radially insides of the first claw-like magnetic poles 21b and/or the second claw-like magnetic poles 22b, the fixing members 31 are reliably prevented from being displaced radially outward. The fixing members 31 also have the radial coupling portions 31b and 31c extending in the radial direction to the radially outer end surfaces of the first and second interpole magnets 26 and 27 along the circumferential end surfaces of the first and second interpole magnets 26 and 27, and the contacting/holding portions 31b and 31e extending in the circumferential direction from the radially outer ends of the radial coupling portions 31b and 31c so as to cover the radially outer end surfaces of the first and second interpole magnets 26 and 27, respectively. Accordingly, not only the first and second claw-like magnetic poles 21b and 22b but also the first and second rotor cores 21 and 22 are formed into simple shapes in comparison with those conventionally formed with engagement claws protruding in the circumferential direction. This also makes it possible to, for example, suppress magnetic flux leakage increased by conventional engagement claws, which causes claw-like magnetic poles or namely the first claw-like magnetic poles 21b and the second claw-like magnetic poles 22b to come close to each other in the circumferential direction, so that higher efficiency of the motor 1 is achieved.

(2) The circumferential end surfaces 21h, 21i, 22h and 22i of the first claw-like magnetic poles 21b and the second claw-like magnetic poles 22b are flattened surfaces extending in the radial direction without being inclined relative to the radial direction when seen from the axial direction, which means they result in a simple shape. It is also possible to realize not only suppression of magnetic flux leakage increased by conventional engagement claws, which causes claw-like magnetic poles or namely the first claw-like magnetic poles 21b and the second claw-like magnetic poles 22b to come close each other in the circumferential direction, but also enhances efficiency of the motor 1. Also, in such a case, for instance, interpole magnets (i.e. the first and second interpole magnets 26 and 27) are formed into a shape with a wider circumferential width toward the radially inner end and the circumferential end surfaces of claw-like magnetic pole portions (i.e. the first claw-like magnetic pole 21b and the second claw-like magnetic pole 22b) are similarly inclined relative to the radial direction in order to prevent the interpole magnets from being displaced out, magnetic resistance will increase in radial direction insides of the claw-like magnetic pole portions, but it is also suppressed.

(3) The fixing members 31 serve as a bilateral holding/fixing member, having the radial coupling portions 31b and 31c and the contacting/holding portions 31d and 31e on both circumferential sides of each of the sandwiched portions 31a. Therefore, in comparison with those provided with only one radial coupling portion and one contacting/holding portion in one sandwiched portion, the number of components is reduced. Also, because the radial coupling portions 31b and 31c (the contacting/holding portions 31d and 31e) on both circumferential ends both operate to prevent the sandwiched portions 31a from being displaced in the circumferential direction, not only the sandwiched portions 31a but also the fixing members 31 are held in a more solid state.

(4) The fixing members 31 are made of a non-magnetic substance and it is therefore possible, for instance, to avoid an increase of magnetic flux leakage (short-circuit magnetic flux) caused by the contacting/holding portions 31d and 31e between the first claw-like magnetic poles 21b and the second claw-like magnetic poles 22b.

(5) Because of the annular magnets 23 used as a field magnet member, it is unnecessary to arrange a field magnet winding serving as a field magnet member in the rotor 11. Accordingly, a power supply device for supplying power to a field magnet winding is not required in the motor 1, whereby the motor 1 is made smaller as a whole and manufactured at low costs.

The above second embodiment may be modified as follows.

The fixing members 31 in the above second embodiment may be modified to another shape as long as it contains the sandwiched portion, the radial coupling portion and the contacting/holding portion.

For instance, the sandwiched portions 31a in the above second embodiment may be replaced with sandwiched portions 41, which are, as shown in FIGS. 17A, 17B, 17E, 17G and 17H, radially sandwiched between the radially inner end surfaces of the first and/or second back side auxiliary magnets 24 and/or 25 and the second and/or first core bases 22a and/or 21a.

Also, for instance, as shown in FIGS. 17F to 17J, the fixing members 31 may also have surrounding portions 42 extending radially inward from distal ends of the contacting/holding portions 31d and 31e along the circumferential end surfaces of the first and second interpole magnets 26 and 27 so as to hold the first and second interpole magnets 26 and 27 with the radial coupling portions 31b and 31c in the circumferential direction. Such a structure makes it possible to prevent the fixing members from being displaced radially outward, or more precisely, further prevent the contacting/holding portions 31d and 31e from being deformed and the first and second interpole magnets 26 and 27 from being displaced radially outward.

Figure 17A:
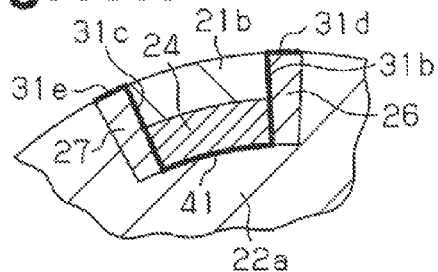
FIGS. 17A to 17J are partial cross-sectional views showing rotors according to modifications of the second embodiment.
Figure 17F:
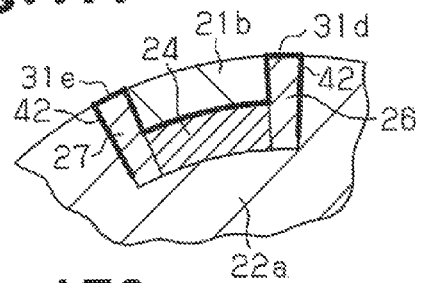
Figure 17B:
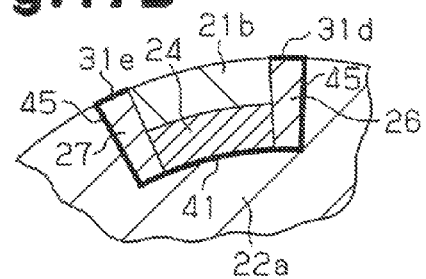
Figure 17G:
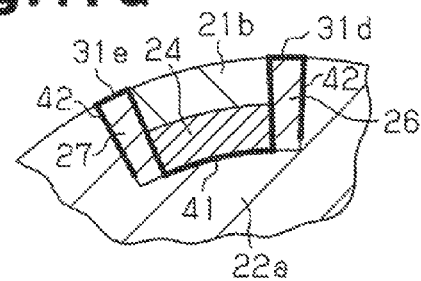
Figure 17C:
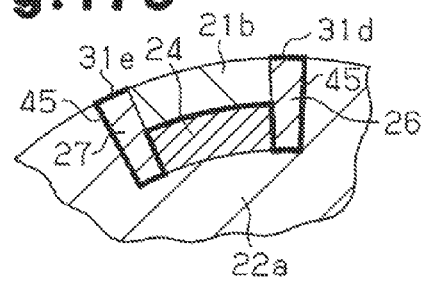
Figure 17H:
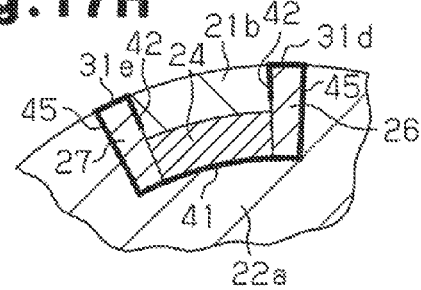
Figure 17D:
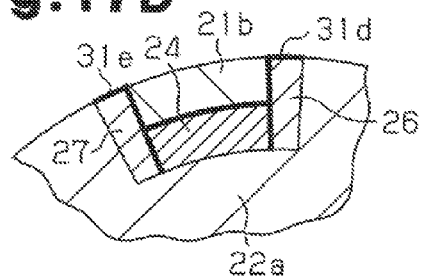
Figure 17I:
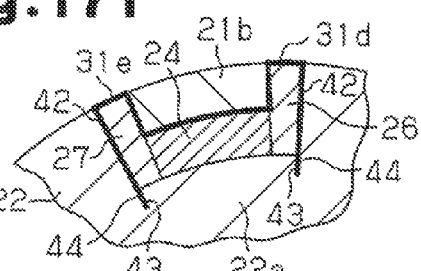

Also, for instance, as shown in FIGS. 17I an d17J, the fixing members 31 may also have auxiliary fixing end portions 44 that extend from distal ends of the surrounding portions 42 to be inserted into grooves 43 formed in the second and/or first rotor core 22 and/or 21 in order to restrict outward movement of the surrounding portions 42 in the radial direction. Such a structure makes it possible to prevent the fixing members from being displaced radially outward, or more precisely, further prevent the contacting/holding portions 31d and 31e from being deformed and the first and second interpole magnets 26 and 27 from being displaced radially outward. Although the auxiliary fixing end portions 44 are press-fitted and held in the grooves 43 in this modification, press-fitting is not required if the grooves 43 and the auxiliary fixing end portions 44 are shaped to extend in the circumferential direction as shown in FIG. 17J.

Also, for instance, the above radial coupling portions 31b and 31c extend radially outward along the circumferential end surfaces of the first and second interpole magnets 26 and 27 disposed near the sandwiched portions 31a. Instead, the radial coupling portions 31b and 31c may be, as shown in FIGS. 17B, 17C, 17E and 17H, replaced with radial coupling portions 45 extending along the circumferential end surfaces of the first and second interpole magnets 26 and 27 located away from the sandwiched portions 31a and 41.

Figure 17E:
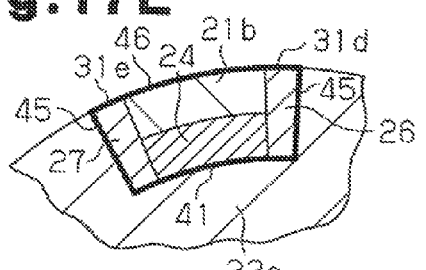
Figure 17J:
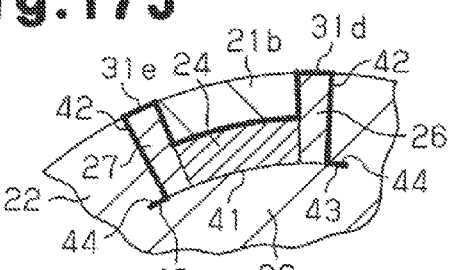

Also, for instance, the fixing members 31 may also have coated portions 46 as shown in FIG. 17E to cover the radially outer end surfaces of the first and second claw-like magnetic poles 21b and 22b.

Moreover, in the above second embodiment and the modifications thereof, the fixing member 31 serves as a bilateral holding/fixing member, having the radial coupling portions 31b, 31c and 45 and the contacting/holding portions 31d and 31e on both circumferential sides of each of the sandwiched portions 31a, but may be replaced with fixing members in which only one radial coupling portion and one contacting/holding portion are provided in one sandwiched portion.

Figure 18:
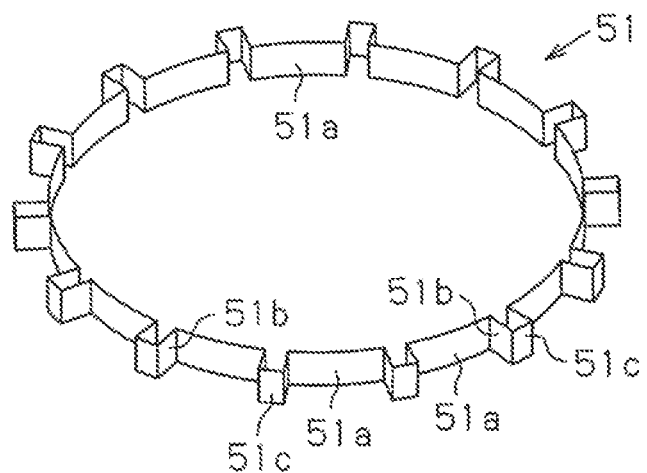
FIG. 18 is a perspective view showing an annular fixing member (i.e. fixing member) according to a modification of the second embodiment.
Figure 19:
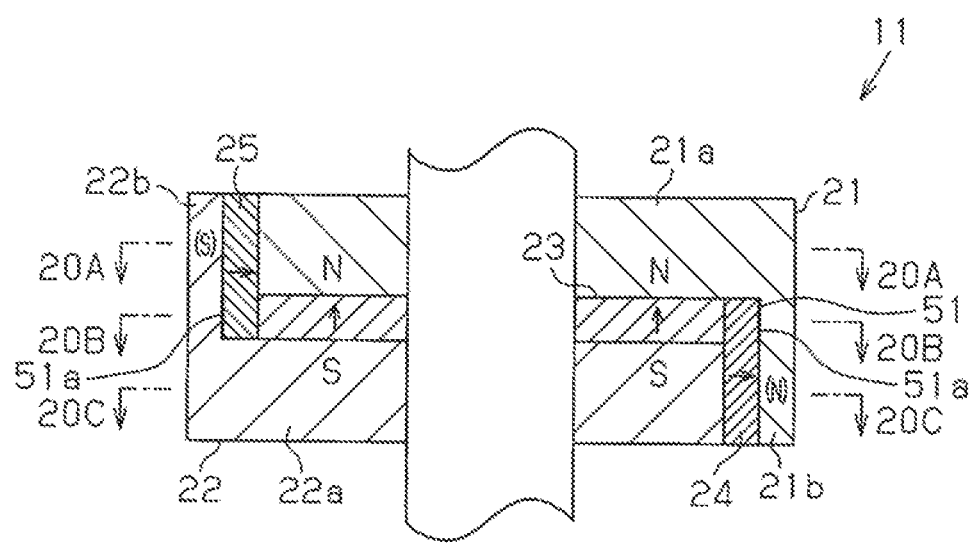
FIG. 19 is a cross-sectional view showing a rotor according to a modification of the second embodiment.
Figure 20A:
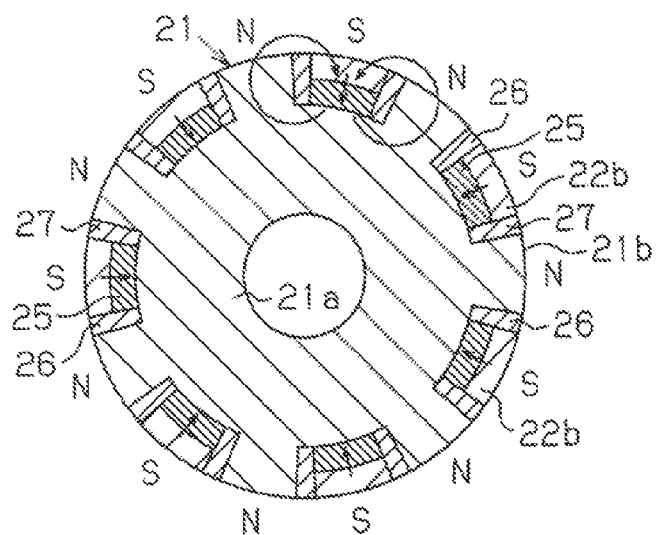
FIG. 20A is a cross-sectional view taken along line 20A-20A of FIG. 19.
Figure 20B:
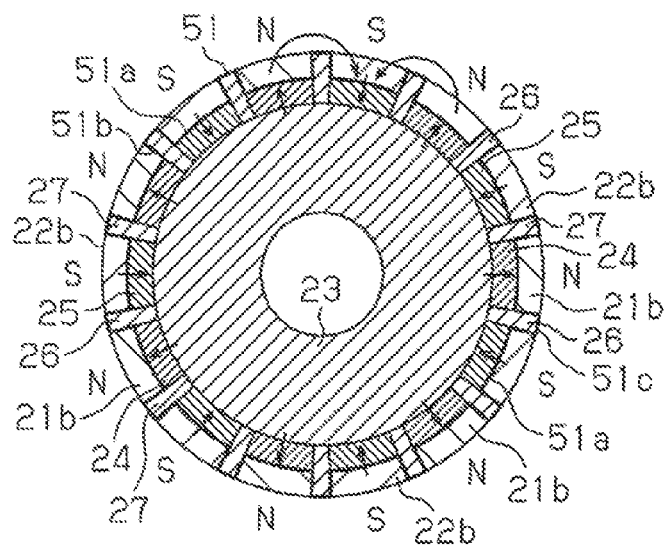
FIG. 20B is a cross-sectional view taken along line 20B-20B of FIG. 19.
Figure 20C:
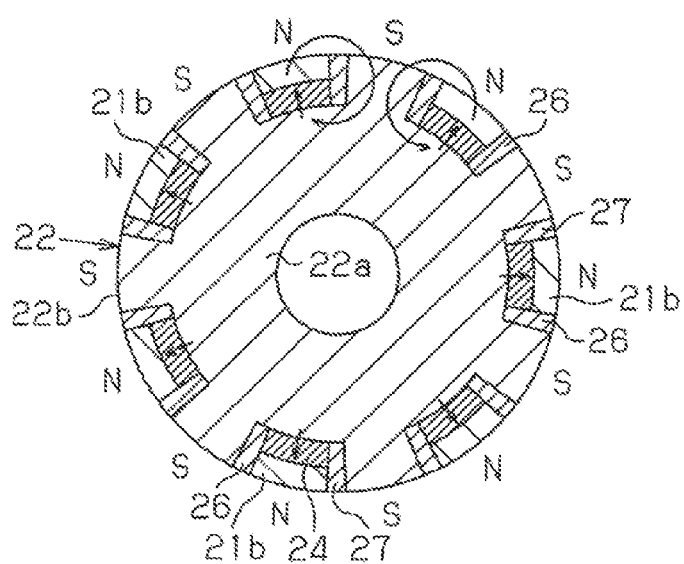
FIG. 20C is a cross-sectional view taken along line 20C-20C of FIG. 19.
Figure 21:
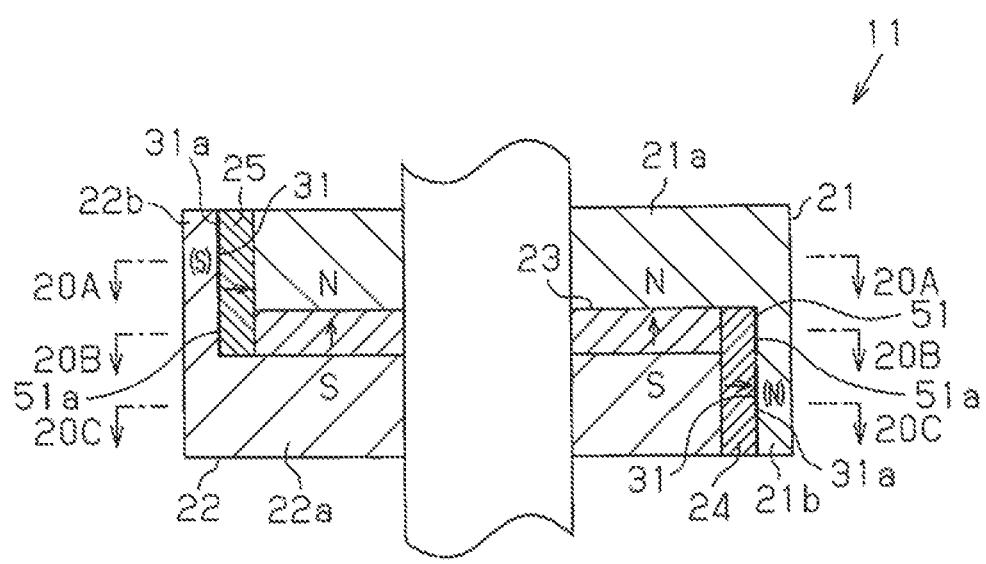
FIG. 21 is a cross-sectional view showing a rotor according to a modification of the second embodiment.

The fixing members 31 may also be replaced with an annular fixing member 51 of a single piece by which the first and second interpole magnets 26 and 27 are locked entirely as shown in FIGS. 18 to 20.

That is, the annular fixing member 51 is formed as shown in FIG. 18 in which sandwiched portions 51a, radial coupling portions 51b and contacting/holding portions 51c constitute a continuous annular shape in the circumferential direction. Then, the annular fixing member 51 is assembled as shown in FIGS. 19 and 20 at a position in the axial position at which the annular magnet 23 is positioned in order to prevent the first and second interpole magnets 26 and 27 from being displaced radially outward. In such a structure, the annular fixing member 51 of a single piece serves as a fixing member and it is therefore possible to prevent the first and second interpole magnets 26 and 27 from being displaced radially outward with a small number of components.

The rotor 11 may also be provided with both the fixing members (i.e. bilateral holding/fixing members) 31 of the above second embodiment and the annular fixing member 51 of the above modification (see FIGS. 18 to 20). Such a structure further prevents the first and second interpole magnets 26 and 27 from being displaced radially outward.

In the above second embodiment, the fixing members 31 are made of a stainless board of a non-magnetic substance, but the present invention is not limited to that and other materials may also be used. The fixing members 31 may also be made of, for instance, materials other than metal or more specifically, plastic materials of a non-magnetic substance. In such a structure, in comparison with the fixing members 31 made of metal (i.e. the above second embodiment), breakage and damage of the first and second back side auxiliary magnets 24 and 25 and the first and second interpole magnets 26 and 27 are reduced.

Although the above second embodiment uses the annular magnet 23 as a field magnet member, a field magnet winding which is magnetized in response to power supply may also be used as a field magnet member.

Third Embodiment

Described below with reference to FIGS. 22 to 25 is a third embodiment according to the present invention. The third embodiment differs from the first and second embodiments in that fitting members are used as a fixing member for fixing the interpole magnets.

Figure 22:
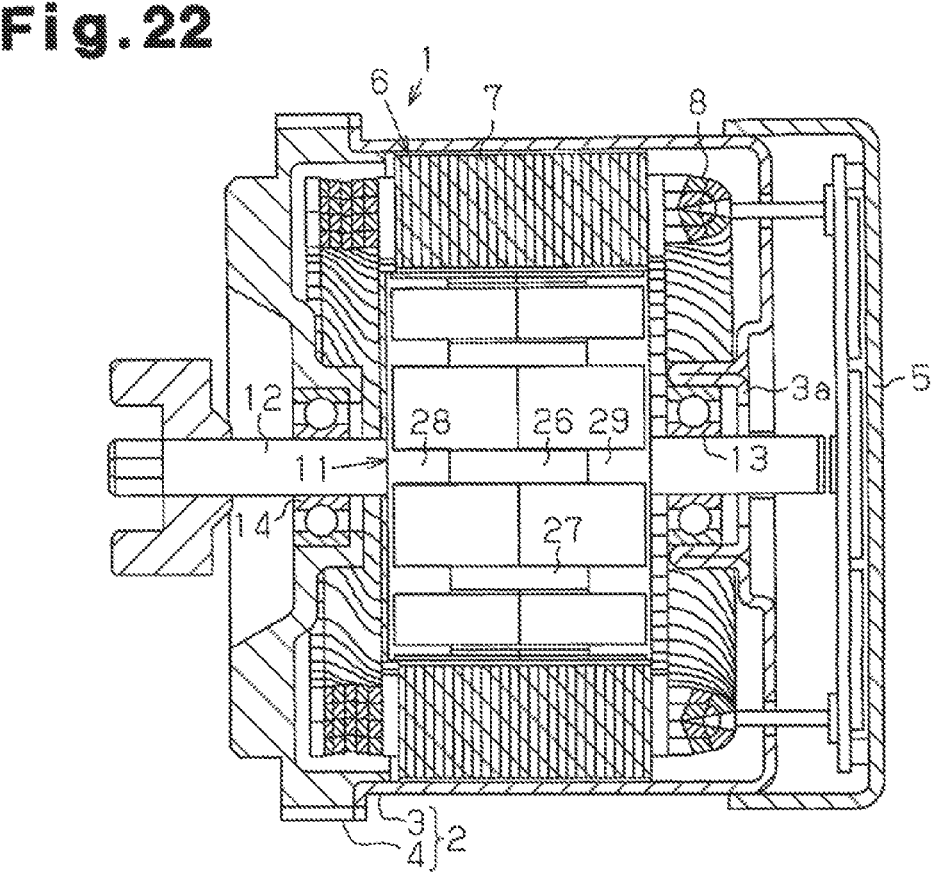
FIG. 22 is a cross-sectional view showing a motor according to a third embodiment.

As shown in FIG. 22, a motor 1 in the third embodiment has a similar basic structure to the first embodiment.

As shown in FIGS. 23 to 26, the rotor 11 includes two pairs of the first and second rotor cores 21 and 22, the annular magnets 23 serving as a field magnet (see FIGS. 25 and 26), the first and second back side auxiliary magnets 24 and 25 serving as a back side auxiliary magnet (see FIGS. 24 and 25), the first and second interpole magnets 26 and 27 serving as an interpole magnet (see FIG. 24), and a pair of fitting members 28 and 29.

Each of the first rotor cores 21 has the first core base 21a of a substantially disk shape and a plurality (five in the present embodiment) of the first claw-like magnetic poles 21b formed in the outer periphery of the first core base 21a. Each of the first claw-like magnetic poles 21b is formed to protrude radially outward and extend along the axial direction. The circumferential end surfaces 21h and 21i of the first claw-like magnetic poles 21b are flattened surfaces extending in the radial direction without being inclined relative to the radial direction when seen from the axial direction, and the first claw-like magnetic poles 21b are formed into a sectoral shape in a cross-sectional view in the direction orthogonal to the shaft. The circumferential width (angle) of each of the first claw-like magnetic poles 21b or namely the width (angle) between the circumferential end surfaces 21h and 21i is set to be less than the width (angle) of a clearance made by circumferentially adjacent first claw-like magnetic poles 21b. The first claw-like magnetic poles 21b are also formed into a rectangular shape when seen from the outside in the radial direction.

Figure 25:
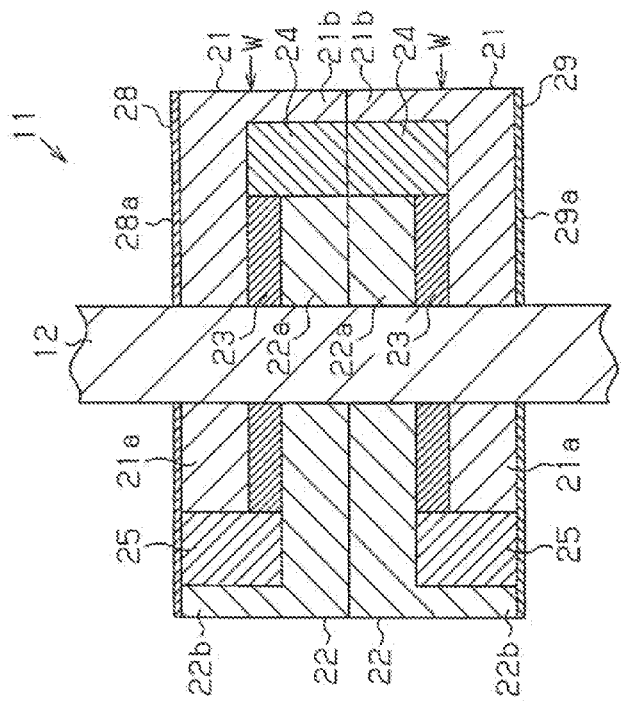
FIG. 25 is a cross-sectional view showing the rotor according to the third embodiment.

The second rotor cores 22 are in the same shape as the first rotor cores 21. That is, each of the second rotor cores 22 has the second core base 22a of a substantially disk shape (see FIG. 25) and a plurality of (five in the present embodiment) of the second claw-like magnetic poles 22b formed in the outer periphery of the second core bases 22a. Each of the second claw-like magnetic poles 22b is formed to protrude radially outward and extend in the axial direction. The circumferential end surfaces 22h and 22i of the second claw-like magnetic poles 22b are flattened surfaces extending in the radial direction without being inclined relative to the radial direction when seen from the axial direction and the second claw-like magnetic poles 21b are formed into a sectoral shape in a cross-sectional view in the direction orthogonal to the shaft. The circumferential width (angle) of each of the second claw-like magnetic poles 22b, namely, the width (angle) between the circumferential end surfaces 22h and 22i, is set to be less than the width (angle) of a clearance made by circumferentially adjacent second claw-like magnetic poles 22b. The second claw-like magnetic poles 22b are also formed into a rectangular shape when seen from the outside in the radial direction. Then, the second rotor cores 22 are assembled to the first rotor cores 21 such that each of the second claw-like magnetic poles 22b is placed between two of the corresponding first claw-like magnetic poles 21b. That is, the first and second claw-like magnetic poles 21b and 22b are arranged alternately in the circumferential direction. Also, as shown in FIG. 25, the annular magnets 23 are placed or interposed in the axial direction between the first core bases 21a and the second core bases 22a, which are opposes to each other. In this case, grooves that are rectangular when seen from the outside in the radial direction are formed between circumferentially adjacent first claw-like magnetic poles 21b and second claw-like magnetic poles 22b.

The annular magnets 23 are set to have the same outer diameter as the first and second core bases 21a and 22a. The annular magnets 23 are magnetized in the axial direction so as to cause the first claw-like magnetic poles 21b to function as a first magnetic pole (i.e. north pole in the present embodiment) and the second claw-like magnetic poles 22b to function as a second magnetic pole (i.e. south pole in the present embodiment).

Also, as shown in FIG. 25, each of the first back side auxiliary magnets 24 is placed between the back (radially inner surface) of each of the first claw-like magnetic poles 21b and the outer periphery surface of each of the second core bases 22a. The first back side auxiliary magnets 24 are formed into a substantially rectangular parallelepiped of a sectoral shape in a cross-sectional view in the direction orthogonal to the shaft. The first back side auxiliary magnets 24 are magnetized in the radial direction such that faces thereof contacting the backs of the first claw-like magnetic poles 21b are the same north pole as the first claw-like magnetic poles 21b and faces thereof contacting the second core bases 22a are the same south pole as the second core bases 22a in order to reduce magnetic flux leakage in areas where the first back side auxiliary magnets 24 are arranged.

Figure 24:
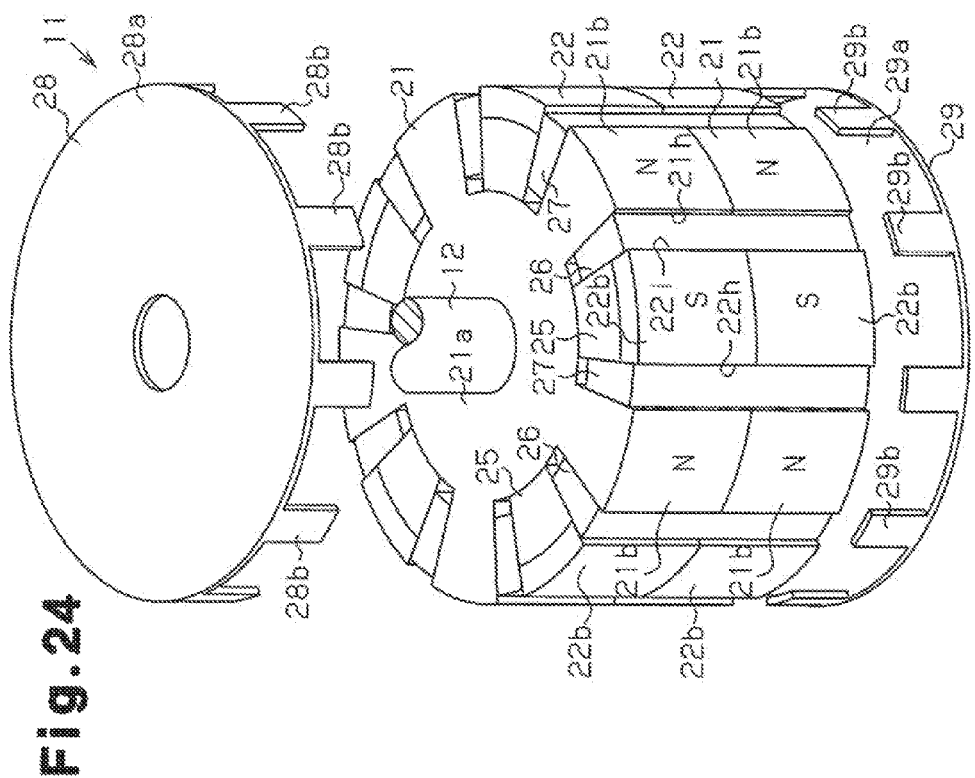
FIG. 24 is a partial exploded perspective view showing the rotor according to the third embodiment.

Also, as shown in FIGS. 24 and 25, each of the second back side auxiliary magnets 25 is placed between the back (radially inner surface) of each of the second claw-like magnetic poles 22b and the outer periphery surface of each of the first core bases 21a. The second back side auxiliary magnets 25 are formed into a substantially rectangular parallelepiped of a sectoral shape in a cross-sectional view in the direction orthogonal to the shaft. The second back side auxiliary magnets 25 are magnetized in the radial direction such that faces thereof contacting the backs of the second claw-like magnetic poles 22b are the same south pole as the second claw-like magnetic poles 22b and faces thereof contacting the first core bases 21a are the same north pole as the first core bases 21a in order to reduce magnetic flux leakage in areas where the second back side auxiliary magnets 25 are arranged.

In addition, the first back side auxiliary magnets 24 and the second back side auxiliary magnets 25 are formed, as shown in FIG. 25, such that they are laid to overlap each other in the axial direction at positions in the axial direction at which the annular magnets 23 are positioned, or in other words, they are also placed at a position in the axial direction at which the annular magnet 23 is positioned.

Then, each of a pair of intermediate members W is composed of the first and second rotor cores 21 and 22, the annular magnet 23 and the first and second back side auxiliary magnets 24 and 25 as stated above. The intermediate members W are laminated so as to be symmetrical in the axial direction (see FIG. 25).

Then, the first and second interpole magnets 26 and 27 are arranged between the first claw-like magnetic poles 21b and the second claw-like magnetic poles 22b in the circumferential direction. Specifically, the axial length of each of the first and second interpole magnets 26 and 27 in the present embodiment is set to be twice as long as the axial length of each of the first and second claw-like magnetic poles 21b and 22b. The first and second interpole magnets 26 and 27 are also formed into a substantially rectangular parallelepiped of a sectoral shape in a cross-sectional view in the direction orthogonal to the shaft. Then, the first interpole magnets 26 are placed between one flattened surfaces, which are created by the circumferential end surfaces 21h on one side of the first claw-like magnetic poles 21b and the circumferential end surfaces of the first back side auxiliary magnets 24, and the other flattened surfaces, which are created by the circumferential end surfaces 22i on the other side of the second claw-like magnetic poles 22b and the circumferential end surfaces of the second back side auxiliary magnets 25. The second interpole magnets 27 in the present embodiment are also placed between one flattened surfaces, which are created by the circumferential end surface 21i on the other side of the first claw-like magnetic poles 21b and the circumferential end surfaces of the first back side auxiliary magnets 24, and the other flattened surfaces, which are created by the circumferential end surface 22h on one side of the second claw-like magnetic pole 22b and the circumferential end surfaces of the second back side auxiliary magnets 25. Then, first and second interpole magnets 26 and 27 are magnetized in the circumferential direction so as to have the same polarities as the first and second claw-like magnetic poles 21b and 22b, which are opposed thereto in the circumferential direction, respectively. That is, each of the first and second interpole magnets 26 and 27 is magnetized in the circumferential direction so as to have the north pole in an area opposed to the first claw-like magnetic pole 21b and have the south pole in an area opposed to the second claw-like magnetic pole 22b.

Then, the fitting members 28 and 29 are fitted onto both axial ends of the first and second rotor cores 21 and 22 provided with the components as assembled above.

The fitting members 28 and 29 are made of a non-magnetic substance (a plastic material in the present embodiment). The fitting members 28 and 29 have disk portions 28a and 29a, each of which has a center hole for inserting the rotary shaft 12 therethrough and a plurality (ten pieces in the present embodiment) of engagement pieces 28b and 29b, which are arranged in the circumferential direction and extend in the axial direction from outer edges of the disk portions 28a and 29a, respectively. The fitting members 28 and 29 function as a holding member for holding the first and second interpole magnets 26 and 27 in order to restrict outward movement of the first and second interpole magnets 26 and 27 in the radial direction.

In concrete terms, the disk portions 28a and 29a are set to have the same outer diameter as the first and second rotor cores 21 and 22, or more precisely, the same diameter as a circle to connect radially outer ends of the first and second claw-like magnetic poles 21b and 22b. Then, the disk portions 28a and 29a are arranged to be contacting both axial ends of the first and second rotor cores 21 and 22, which are assembled as described above. The disk portions 28a and 29a in the present embodiment also constitute, as shown in FIG. 25, back side axial engagement portions that contact, or are or engaged with, axial end surfaces (exposed surfaces) of the second back side auxiliary magnets 25 in the axial direction in order to restrict movement of the second auxiliary magnet 25 in the axial direction. The disk portions 28a and 29a in the present embodiment also constitute, as shown in FIG. 26, interpole axial engagement portions that contact, or are engaged with, axial end surfaces of the first and second interpole magnets 26 and 27 in the axial direction in order to restrict movement of the first and second interpole magnets 26 and 27 in the axial direction.

The engagement pieces 28b and 29b are formed to contact, or be engaged with, the first and second interpole magnets 26 and 27 in the radial direction in order to restrict outward movement of the first and second interpole magnets 26 and 27 in the radial direction, respectively. More precisely, the cross-sectional shape of the engagement pieces 28b and 29b in the direction orthogonal to the shaft is constant in the axial direction. The engagement pieces 28b and 29b are formed into an arcuate shape along outer peripheral surfaces of the first and second interpole magnets 26 and 27 when seen from the axial direction or more precisely along radially outer end surfaces of an arcuate shape. The distance from the axis of radially outer end surfaces in the engagement pieces 28b and 29b is set to be the same as the distance from the axis to radially outer end surfaces in the first and second claw-like magnetic poles 21b and 22b such that one circle is formed by the radially outer end surfaces in the engagement pieces 28b and 29b and the radially outer end surfaces in the first and second claw-like magnetic poles 21b and 22b. The axial length of each of the engagement pieces 28b and 29b in the present embodiment is also set to be about one fifth of the axial length of each of the first and second interpole magnets 26 and 27.

Figure 23:
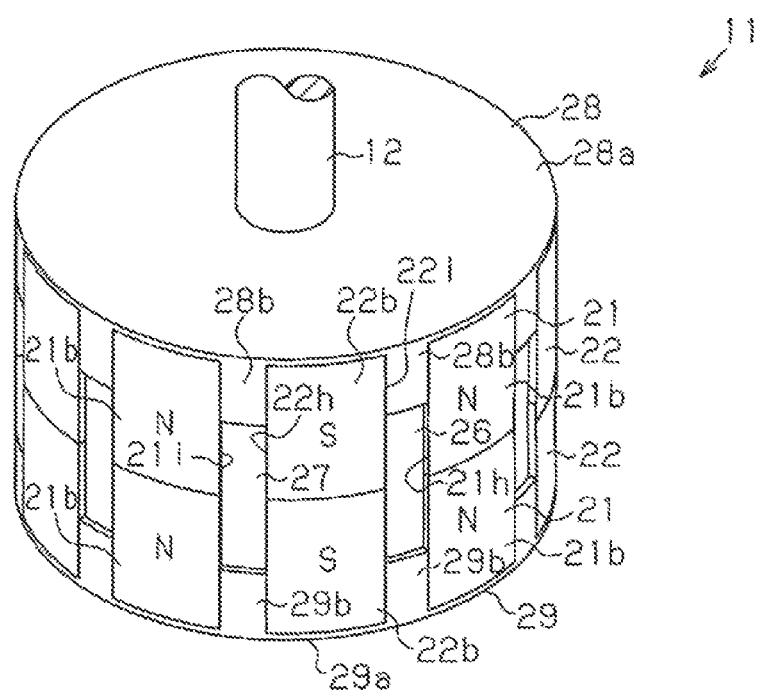
FIG. 23 is a perspective view showing a rotor according to the third embodiment.
Figure 26:
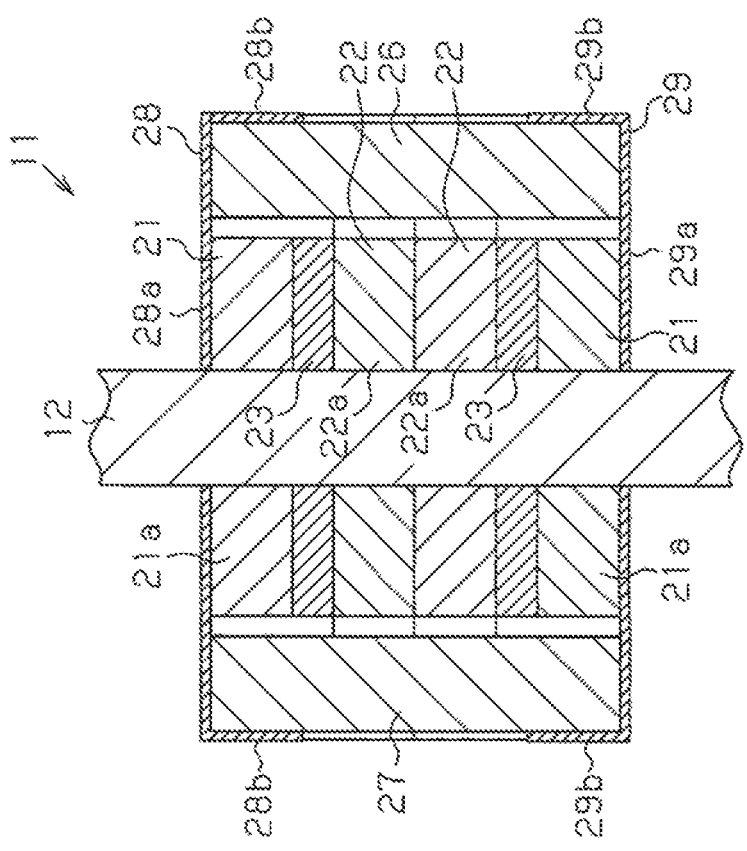
FIG. 26 is a cross-sectional view showing the rotor according to the third embodiment.

Then, the fitting members 28 and 29 are fitted to both axial ends of members made of the first and second rotor cores 21 and 22 and other components as shown in FIGS. 23, 25 and 26 by press-fitting and fixing the center holes of the disk portions 28a and 29a and the rotary shaft 12.

Next, operation of the motor 1 configured as described above will be described.

The rotor 11 is provided with the first and second back side auxiliary magnets 24 and 25 and the first and second interpole magnets 26 and 27. Therefore, not only magnetic flux leakage is reduced in areas where the magnets 24 to 27 are arranged, but also magnetic flux of the annular magnets 23 is efficiently used for output of the motor 1. In addition, even though large centrifugal force is applied to the first and second interpole magnets 26 and 27 when the rotor 11 rotates, engagement of the engagement pieces 28b and 29b in the radial direction prevents the first and second interpole magnets 26 and 27 from being displaced radially outward.

Next, characteristic advantages of the above third embodiment will be described below.

(1) Owing to the arrangement of the first and second interpole magnets 26 and 27 magnetized in the circumferential direction between circumferentially adjacent first and second claw-like magnetic poles 21b and 22b, magnetic flux leakage is reduced in areas between the first claw-like magnetic poles 21b and the second claw-like magnetic poles 22b. Therefore, magnetic flux of the annular magnet 23 is used efficiently for output of the motor 1 and, for instance, higher efficiency and higher output of the motor 1 are achieved. The rotor 11 is also provided with the pair of fitting members 28 and 29, which are fitted to both axial ends of the assembled first and second rotor cores 21 and 22 and have the engagement pieces 28b and 29b engaged with the first and second interpole magnets 26 and 27 in the radial direction, respectively. Thus, with a simple structure and assembling, the first and second interpole magnets 26 and 27 are prevented from being displaced radially outward.

Furthermore, since the fitting members 28 and 29 are made of a non-magnetic substance, the fitting members 28 and 29 do not cause an increase of magnetic flux leakage.

(2) Since the distance from the axis to the radially outer end surfaces in the engagement pieces 28b and 29b is set to be the same as the distance from the axis to the radially outer end surfaces in the first and second claw-like magnetic poles 21b and 22b, the engagement pieces 28b and 29b do not protrude radially outward beyond the first and second claw-like magnetic poles 21b and 22b. Therefore, for instance, the engagement pieces 28b and 29b do not cause expansion of an air gap to the stator 6 arranged in the outside of the rotor 11 in the radial direction.

(3) The fitting members 28 and 29 have the disk portions 28a and 29a that constitute the interpole axial engagement portions to contact, or be engaged with, the axial end surfaces of the first and second interpole magnets 26 and 27 in the axial direction in order to restrict movement of the first and second interpole magnets 26 and 27 in the axial direction, respectively. Therefore, without requiring any further additional components, the first and second interpole magnets 26 and 27 are prevented from being displaced out in the axial direction by a simple structure and assembling.

(4) The fitting members 28 and 29 have the disk portions 28a and 29a that constitute the back side axial engagement portions to be fitted to or engaged with the axial end surfaces (exposed surfaces) of the second back side auxiliary magnets 25 in the axial direction in order to restrict movement of the second back side auxiliary magnet 25 in the axial direction, respectively. Therefore, without requiring any further additional components, the second back side auxiliary magnet 25 is prevented from being displaced out in the axial direction by a simple structure and assembling.

The above third embodiment may be modified as follows.

Figure 27:
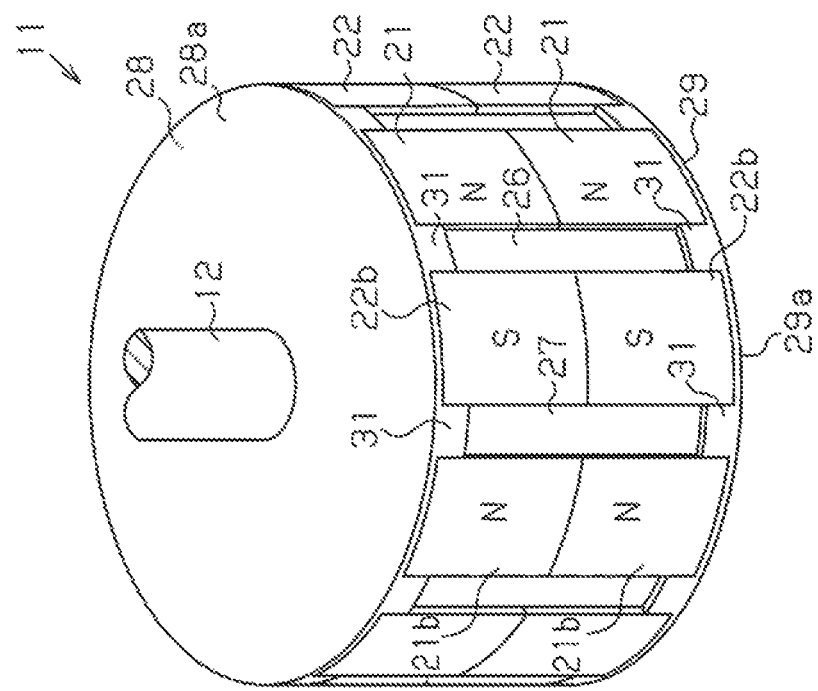
FIG. 27 is a perspective view showing a rotor according to a modification of the third embodiment.

In the above third embodiment, the engagement pieces 28b and 29b are formed into an arcuate shape when seen from the axial direction and to have a constant cross-sectional shape in the direction orthogonal to the shaft, but the present invention is not limited to that and they may also be modified as shown in, for instance, FIGS. 27 to 29.

More precisely, in this modification (see FIGS. 27 to 29), chamfered portions 26d and 27d are formed in radially outer ends of both axial ends in the first and second interpole magnets 26 and 27 as shown in FIGS. 28 and 29, respectively. Then, engagement pieces 30 and 32 in this modification (see FIGS. 27 to 29) have inclined surfaces 30a and 32a, which are inclined in the axial direction so as to be brought into surface contact with the chamfered portions 26d and 27d as shown in FIGS. 28 and 29, respectively. Also with such a structure, similar advantages to those of the above third embodiment are obtained. Such a structure also easily enhances rigidity of the engagement pieces 30 and 32.

Figure 30:
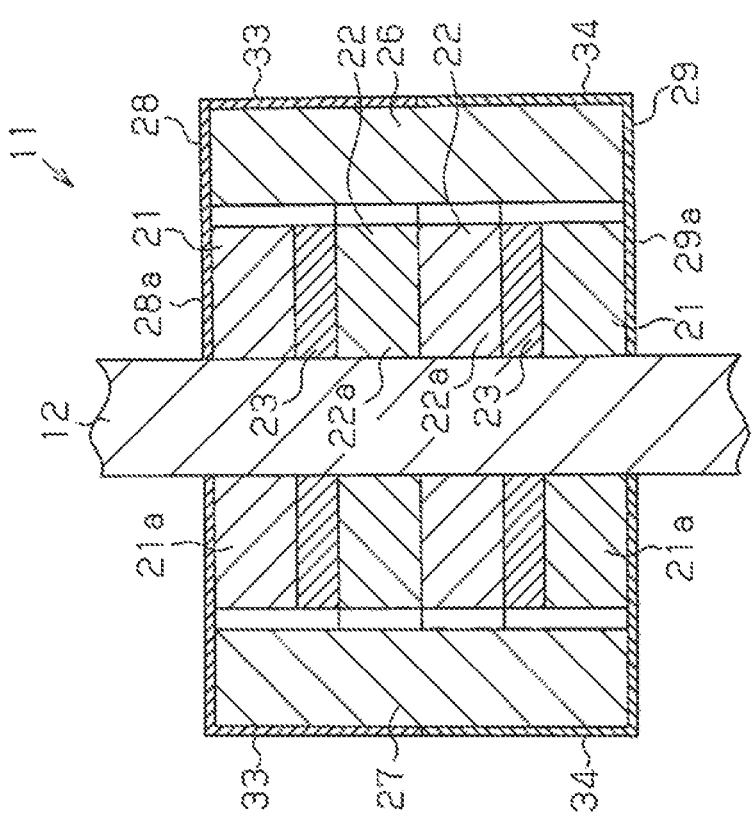
FIG. 30 is a perspective view showing a rotor according to another modification of the third embodiment.
Figure 31:
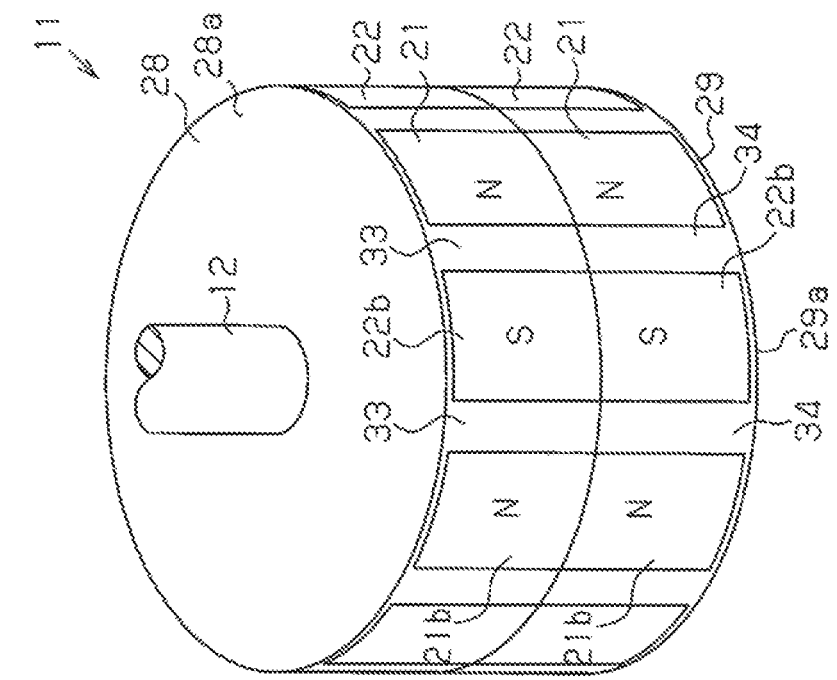
FIG. 31 is a cross-sectional view showing the rotor according to another modification of the third embodiment.

In the above third embodiment, the axial length of each of the engagement pieces 28b and 29b is set to be about one fifth of the axial length of each of the first and second interpole magnets 26 and 27, but the present invention is not limited to that and may be modified as shown in, for instance, FIGS. 30 and 31.

The axial length of each of engagement pieces 33 and 34 in this modification (see FIGS. 30 and 31) are set to be half of the axial length of each of the first and second interpole magnets 26 and 27 so as to cover the entire radially outer surfaces of the first and second interpole magnets 26 and 27, respectively. In such a structure, even if the first and second interpole magnets 26 and 27 are broken for instance, it is possible to prevent fragments thereof from being displaced radially outward.

Figure 33:
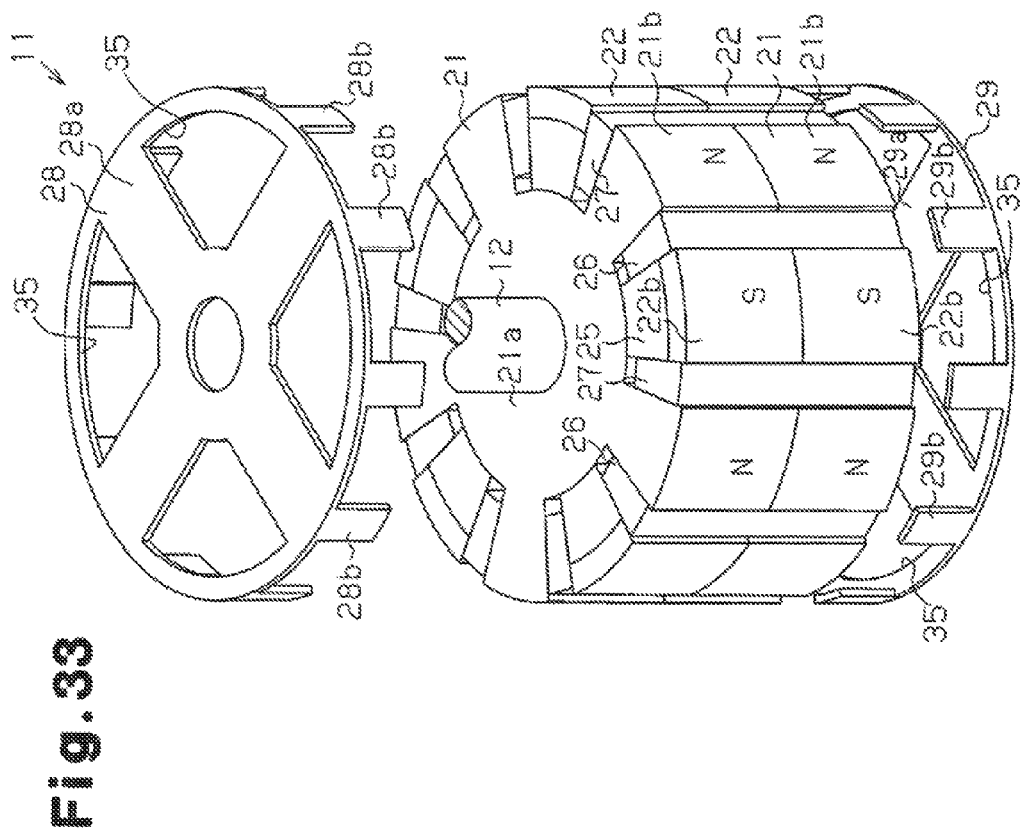
FIG. 33 is a partial exploded perspective view showing the rotor according to a modification of the third embodiment.
Figure 32:
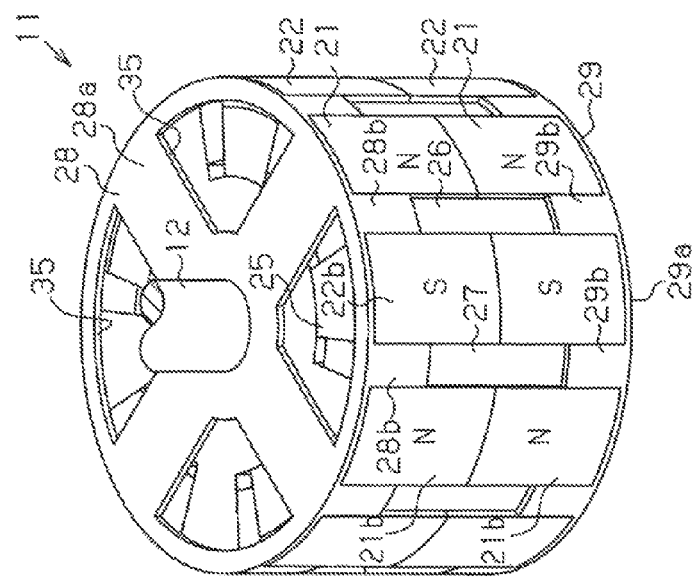
FIG. 32 is a perspective view showing a rotor according to a modification of the third embodiment.

Holes may also be partially formed in the disk portions 28a and 29a in the fitting members 28 and 29 of the third embodiment, respectively. For instance, as shown in FIGS. 32 and 33, a plurality (four in this modification) of holes 35 may be formed in the disk portions 28a and 29a at equal angle intervals. Such a structure allows suppression of a weight increase of the rotor 11 caused by the fitting members 28 and 29.

Figure 34:
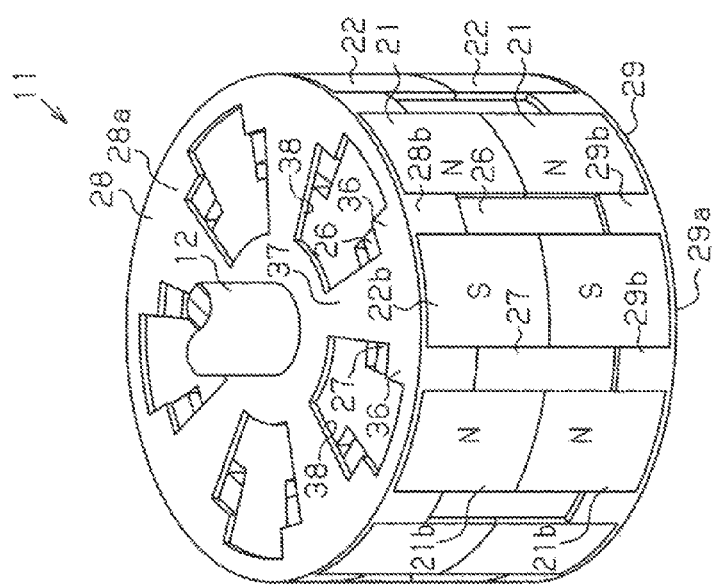
FIG. 34 is a perspective view showing a rotor according to a modification of the third embodiment.
Figure 35:
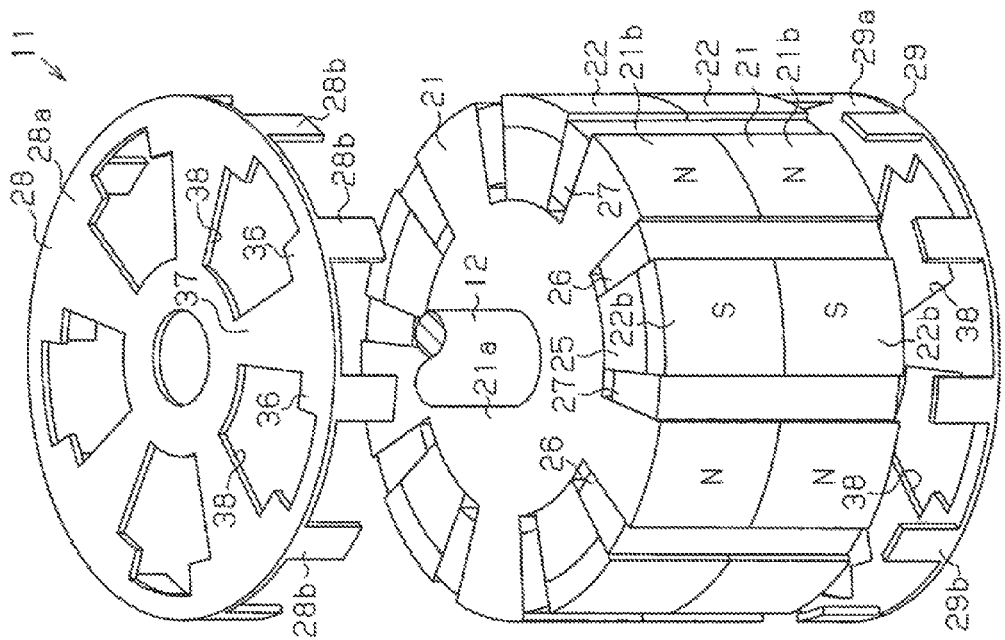
FIG. 35 is a partial exploded perspective view showing the rotor according to a modification of the third embodiment.

Also, for instance, as shown in FIGS. 34 and 35, holes 38 may also be formed in the disk portions 28a and 29a so as to create interpole axial @engagement portions 36, which contact, or are engaged with, axial end surfaces of the first and second interpole magnets 26 and 27 in the axial direction, and back side axial engagement portions 37, which contact, or are engaged with, axial end surfaces (exposed surfaces) of the second back side auxiliary magnets 25 in the axial direction. Such a structure allows suppression of a weight increase of the rotor 11 caused by the fitting members 28 and 29 while obtaining similar advantages to 3) and 4) of the above third embodiment.

In the above third embodiment, the fitting members 28 and 29 are fitted by fixing the center holes of the disk portions 28a and 29a and the rotary shaft 12 through press-fitting, but the present invention is not limited to that and they may be fitted by, for instance, fixing the engagement pieces 28b and 29b between the first and second claw-like magnetic poles 21b and 22b through press-fitting.

In the third embodiment, the fitting members 28 and 29 are made of a plastic material but the present invention is not limited to that and other non-magnetic substances may also be used. For instance, the fitting members may be made of stainless steel, copper, copper alloy, aluminum and aluminum alloy.

In the third embodiment, the rotor 11 is implemented with lamination of the pair of the intermediate members W composed of the first and second rotor cores 21 and 22, the annular magnets 23 and the first and second back side auxiliary magnets 24 and 25, but the present invention is not limited to that and the rotor may be implemented without lamination of the intermediate members W.

In the above third embodiment, the rotor 11 is provided with the back side auxiliary magnets (i.e. the first and second back side auxiliary magnets 24 and 25), but the present invention is not limited to that and may be replaced with a rotor which does not have the back side auxiliary magnets.

The invention claimed is:

1. A rotor comprising:
first and second rotor cores, each having a core base of a substantially disk shape, wherein the core bases are placed to oppose each other, the first and second rotor cores each having a plurality of claw-like magnetic poles arranged in an outer periphery of the core base in a circumferential direction at even intervals and formed to protrude outwards in a radial direction and to extend in an axial direction, the claw-like magnetic poles of the first rotor core and the claw-like magnetic poles of the second rotor core being arranged alternately in the circumferential direction;
a field magnet arranged between the core bases in an axial direction of the rotor and magnetized in the axial direction to cause the claw-like magnetic poles of the first rotor core to function as a first magnetic pole and cause the claw-like magnetic poles of the second rotor core to function as a second magnetic pole;
interpole magnets each arranged between a circumferentially adjacent pair of the claw-like magnetic poles, each interpole magnet being magnetized in the circumferential direction to have the same polarity as the claw-like magnetic poles opposed thereto in the circumferential direction; and
a holding member for holding the interpole magnets in order to restrict radially outward movement of the interpole magnets, wherein
the holding member includes a pair of fitting members fitted to the axial ends of the first and second rotor cores, which are assembled to each other,
back side auxiliary magnets, which are magnetized in the radial direction, are arranged at positions radially inward of the claw-like magnetic poles, and
each of the fitting members has a back side axial engagement portion to be engaged in the axial direction in order to restrict axial movement of the back side auxiliary magnets.

2. The rotor according to claim 1, wherein the holding member is brought into contact with radially outer end surfaces of the interpole magnets in order to hold the interpole magnets.

3. The rotor according to claim 1, further comprising a plurality of back side auxiliary magnetic poles that are arranged radially inward of the claw-like magnetic poles and magnetized in the radial direction,
wherein the holding member includes engagement portions arranged in at least either the claw-like magnetic poles or the back side auxiliary magnets, the holding member being engaged with the interpole magnets in the radial direction in order to restrict radially outward movement of the interpole magnets.

4. The rotor according to claim 3, wherein
the claw-like magnetic poles each include a protrusion protruding radially outward from an outer periphery of the corresponding core base and a claw, which is arranged at a distal end of the protrusion and extends in the axial direction,
the claws are each formed with a circumferential extension extending in the circumferential direction from distal end of the protrusion, and
the engagement portions each include a radially inner surface positioned on the radially inside of the circumferential extension.

5. The rotor according to claim 4, wherein
circumferential end surfaces of each back side auxiliary magnet are flush with circumferential end surfaces of the corresponding protrusion, and
circumferential end surfaces of each interpole magnet contact the circumferential end surfaces of the corresponding protrusion and the circumferential end surfaces of the corresponding back side auxiliary magnet.

6. The rotor according to claim 4, wherein the interpole magnets each have an inner interpole magnetic portion arranged between a circumferentially adjacent pair of the protrusions and an outer interpole magnetic portion arranged between a circumferentially adjacent pair of the claws.

7. The rotor according to claim 6, wherein the radially inner surface of each circumferential extension is a claw inclined surface, which is inclined further radially outward toward the circumferential distal end of the circumferential extension.

8. The rotor according to claim 7, wherein the outer interpole magnet portion each have a bulging portion bulging radially outward beyond the claw inclined surface, and the bulging amount of the bulging portion is set such that the distance from the axis of the rotor to radially outer end of the bulging portion becomes equal to or less than the distance from the axis of the rotor to the radially outer end of the corresponding claw-like magnetic pole.

9. The rotor according to claim 3, wherein the engagement portions each include a back side inclined surface, which is a circumferential end surface of the back side auxiliary magnet, the back side inclined surface being inclined relative to a radial straight line that passes through the axis of the rotor such that the back side inclined surface protrudes further in the circumferential direction beyond the straight line toward the radially outer end.

10. The rotor according to claim 9, wherein
the claw-like magnetic poles each have a protrusion protruding radially outward from outer periphery of the corresponding core base, and a claw, which is arranged at the distal end of the protrusion and extends in the axial direction, and
circumferential end surfaces of at least either the protrusions or the claws are flush with the back side inclined surfaces and partially constitute the engagement portions.

11. The rotor according to claim 9, wherein circumferential end surfaces of each claw-like magnetic pole are positioned circumferentially inward of the corresponding back side inclined surfaces.

12. The rotor according to claim 4, wherein a circumferential width of each of the protrusions is constant in the radial direction.

13. The rotor according to claim 4, wherein a circumferential width of each of the protrusions is made larger toward the radially inner end.

14. The rotor according to claim 1, wherein the holding member includes a fixing member, which includes:
sandwiched portions radially sandwiched at positions radially inward of at least either the first claw-like magnetic poles or the second claw-like magnetic poles;
radial coupling portions extending in the radial direction to radially outer end surfaces of the interpole magnets along circumferential end surfaces of the interpole magnets; and
contacting/holding portions extending in the circumferential direction from radially outer ends of the radial coupling portions to cover the radially outer end surfaces of the interpole magnets.

15. The rotor according to claim 14, wherein circumferential end surfaces of the first claw-like magnetic poles and the second claw-like magnetic poles are flattened surfaces extending in the radial direction.

16. The rotor according to claim 14, wherein the fixing member has a surrounding portion extending radially inward from the distal end of the contacting/holding portion along the circumferential end surface of the corresponding interpole magnet so as to hold the interpole magnet in the circumferential direction with the radial coupling portion.

17. The rotor according to claim 16, wherein
the surrounding portion has a distal end,
the first rotor core or the second rotor core has a groove, and
the fixing member has an auxiliary fixing end portion extending from the distal end of the surrounding portion to be inserted into the groove formed in the first rotor core or the second rotor core in order to restrict radially outward movement of the surrounding portion.

18. The rotor according to claim 14, wherein the fixing member has the radial coupling portions and the contacting/holding portions on both circumferential ends of the sandwiched portion.

19. The rotor according to claim 14, wherein the fixing member is a single annular fixing member capable of fixing all the interpole magnets.

20. The rotor according to claim 14, wherein the fixing member includes:
a plurality of fixing members each having the radial coupling portion and the contacting/holding portion on both circumferential ends of the sandwiched portion; and
a single annular fixing member capable of fixing all the interpole magnets.

21. The rotor according to claim 14, wherein the fixing member is made of a non-magnetic substance.

22. The rotor according to claim 14, wherein the field magnet is an annular magnet.

23. The rotor according to claim 1, wherein the fitting members are made of a non-magnetic substance, and the fitting members have engagement pieces to be engaged in the radial direction in order to restrict radially outward movement of the interpole magnets.

24. The rotor according to claim 23, wherein a distance from the axis of the rotor to radially outer ends in the engagement pieces is set to be equal to or less than a distance from the axis of the rotor to radially outer ends in the claw-like magnetic portions.

25. The rotor according to claim 23, wherein the fitting member has an interpole axial engagement portion to be engaged in the axial direction in order to restrict movement of the corresponding interpole magnet in the axial direction.

26. The rotor according to claim 23, wherein the engagement pieces are formed to cover the entire radially outer surfaces of the interpole magnets.

27. The rotor according to claim 23, wherein the fitting members have holes in areas opposed to the axial end surfaces of the first and second rotor cores.

28. A motor provided with a rotor,
the rotor comprising:
first and second rotor cores, each having a core base of a substantially disk shape, wherein the core bases are placed to oppose each other, the first and second rotor cores each having a plurality of claw-like magnetic poles arranged in an outer periphery of the core base in a circumferential direction at even intervals and formed to protrude outwards in a radial direction and to extend in an axial direction, the claw-like magnetic poles of the first rotor core and the claw-like magnetic poles of the second rotor core being arranged alternately in the circumferential direction;
a field magnet arranged between the core bases in an axial direction of the rotor and magnetized in the axial direction to cause the claw-like magnetic poles of the first rotor core to function as a first magnetic pole and cause the claw-like magnetic poles of the second rotor core to function as a second magnetic pole;
interpole magnets each arranged between a circumferentially adjacent pair of the claw-like magnetic poles, each interpole magnet being magnetized in the circumferential direction to have the same polarity as the claw-like magnetic poles opposed thereto in the circumferential direction; and
a holding member for holding the interpole magnets in order to restrict radially outward movement of the interpole magnets, wherein
the holding member includes a pair of fitting members fitted to the axial ends of the first and second rotor cores, which are assembled to each other,
back side auxiliary magnets, which are magnetized in the radial direction, are arranged at positions radially inward of the claw-like magnetic poles, and each of the fitting members has a back side axial engagement portion to be engaged in the axial direction in order to restrict axial movement of the back side auxiliary magnets.

* * * * *